United States Patent
Naganuma

(12) 
(10) Patent No.: US 6,295,393 B1
(45) Date of Patent: Sep. 25, 2001

(54) POLARIZED LIGHT SYNTHESIZING APPARATUS, A POLARIZED LIGHT SPLITTING APPARATUS AND A PUMP LIGHT OUTPUTTING APPARATUS

(75) Inventor: Norihisa Naganuma, Sapporo (JP)

(73) Assignee: Fujistsu Limited, Kawasaki (JP)

( * ) Notice: Subject to any disclaimer, the term of this patent is extended or adjusted under 35 U.S.C. 154(b) by 0 days.

(21) Appl. No.: 09/236,395

(22) Filed: Jan. 25, 1999

(30) Foreign Application Priority Data

Mar. 12, 1998 (JP) .................................................. 10-061772

(51) Int. Cl.$^7$ ...................................................... G02B 5/30
(52) U.S. Cl. ................................................ 385/11; 385/33
(58) Field of Search .................................. 385/11, 33, 61, 385/79

(56) References Cited

U.S. PATENT DOCUMENTS

| | | | |
|---|---|---|---|
| 4,852,962 | * | 8/1989 | Nicia ........................................ 385/22 |
| 5,278,853 | * | 1/1994 | Shirai et al. ............................ 372/37 |
| 5,377,040 | * | 12/1994 | Naganuma ............................ 359/494 |
| 5,699,187 | * | 12/1997 | Fukushima et al. .................. 359/583 |
| 5,812,307 | * | 9/1998 | Naganuma ............................ 359/341 |

FOREIGN PATENT DOCUMENTS

| | | | |
|---|---|---|---|
| 05-13856 | * | 1/1993 | (JP) ......................................... 372/6 |
| 6-148570 | | 5/1994 | (JP) . |

\* cited by examiner

*Primary Examiner*—John D. Lee
*Assistant Examiner*—Sarah N Song
(74) *Attorney, Agent, or Firm*—Staas & Halsey LLP

(57) ABSTRACT

A polarized light synthesizing apparatus has a lens assembly including a securing member for securing ends of a plurality of optical fibers which can propagate light having different polarization components and a lens for converting the plural kinds of polarization component light emitted from the optical fibers into collimated beams, and a birefringent member for polarization-synthesizing the plural kinds of polarization component light as the same optical axis using a difference in refractive index characteristic between the plural kinds of polarization component light emitted from the lens, thereby largely decreasing a packaging size of the apparatus while keeping functions of a known optical circuit device, a required resistance to light, reliability and readiness of fabrication.

17 Claims, 12 Drawing Sheets

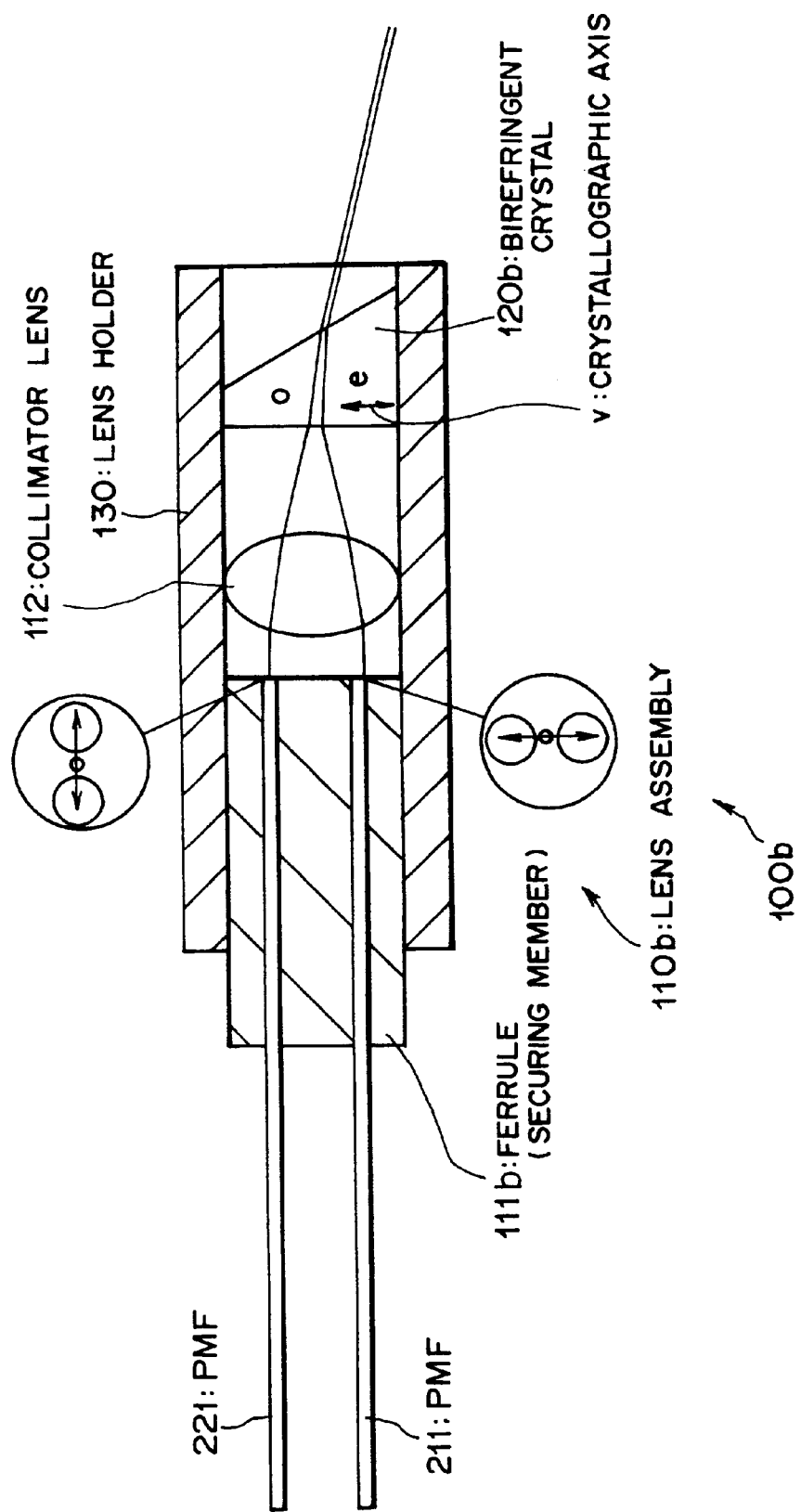

POLARIZED LIGHT SYNTHESIZING APPARATUS, A POLARIZED LIGHT SPLITTING APPARATUS AND A PUMP LIGHT OUTPUTTING APPARATUS

BACKGROUND OF THE INVENTION (1) Field of the Invention

The present invention relates to a polarized light synthesizing apparatus, a polarized light splitting apparatus and a pump light outputting apparatus suitable for use in an optical amplifier for amplifying signal light in an optical communication system.

(2) Description of the Invention

There have been developed optical amplifiers each of which can amplify an optical signal without converting the optical signal into an electric signal in these years with development of an optical communication system. Among them, an optical fiber amplifier using an optical fiber which is doped with an rare-earth element such as erbium (Er) or the like (EDF: Erbium-Doped Fiber) has features such as high gain, low noise and the like, playing an important role in an optical communication system.

Meanwhile, there have been employed WDM (Wavelength Division Multiplexing) optical communication system, TDM (Time Division Multiplexing) optical communication system and the like, as systems for transmitting and communicating signal light of a plurality of channels over one optical fiber simultaneously.

An optical fiber amplifier (hereinafter, called an optical amplifier) used in the WDM optical communication system amplifies input signal waves (signal light) of a plurality of channels such as 4, 8, 16, 32 or 64 waves to output light of high power. Therefore, the optical amplifier requires a high power pumping light source since a pumping power required to amplify the waves is increased as signal light to be amplified is increased.

In order to obtain a high power output of the pumping source, it is necessary to consider employment of techniques for a high power pumping laser, bi-directional pumping, polarization synthesis of pump light, wavelength synthesis of pump light, and the like.

However, in order to realize the technique such as, in particular, polarization synthesis, wavelength synthesis or the like, an optical circuit device adaptable thereto becomes necessary. If devices for respective functions are configured, problem such as an increase in size of the apparatus, an increase of loss caused by insertion of the optical device and the like will arise. It is therefore desirable to integrate the function of polarization synthesis and the function of wavelength synthesis of pump light to configure an optical circuit device (pump light outputting apparatus), thereby suppressing an increase in size of the apparatus or an increase of insertion loss.

FIG. 11 is a plan view schematically showing a structure of a known pump light outputting apparatus. The pump light outputting apparatus shown in FIG. 11 multiplexes pump light obtained by polarization-synthesizing and wavelength-synthesizing four kinds of light and signal light amplified by an EDF. In the pump light outputting apparatus, there are integrated and realized not only the function of polarization-synthesizing pump light and the function of wavelength-synthesizing the same but also a function of synthesizing signal light to be amplified and outputting the same.

The pump light outputting apparatus shown in FIG. 11 has a first polarized light synthesizing unit 51, a second polarized light synthesizing unit 52, wavelength-division multiplexing films (WDMs) 504 and 505, an isolator 506, signal light collimators 510e and 520 and a casing 501.

The first polarized light synthesizing unit 51 has polarized light synthesizing collimators 510a and 510b, a high reflection mirror (HR) 502 and a polarization beam splitter (PBS) 503.

The polarized light synthesizing collimator 510a is configured with a polarization maintaining optical fiber 511a and a collimator lens 512a secured thereto. Similarly, the polarized light synthesizing collimator 510b is configured with a polarization maintaining optical fiber 511b and a collimator lens 512b secured thereto.

These polarized light synthesizing collimators 510a and 510b are secured on an outer periphery of the casing 501. On the other hand, the collimator lenses 512a and 512b are secured inside the casing 501. Pump light inputted from the polarization maintaining optical fibers 511a and 511b is emitted toward the inside of the casing through the collimator lenses 512a and 512b.

The polarization maintaining optical fibers 511a and 511b are configured with birefringent optical fibers, each of which can transmit light at a wavelength of, for example, about 1.46 μm from a pumping source not shown as linearly polarized light (light whose electric field vector always points toward a constant direction) while maintaining a plane of polarization. The linearly polarized light that the polarization maintaining optical fibers 511a and 51b can propagate has electric field vectors pointing different directions. For example, the polarization maintaining optical fiber 511a propagates S wave, whereas the polarization maintaining optical fiber 511b propagate P wave.

The HR 502 totally reflects incident light, which is secured such as to emit pump light of S wave at a wavelength of 1.46 μm inputted from the polarized light synthesizing collimator 510a toward the PBS 503.

The PBS 503 has a property that a transmittance thereof is varied according to a plane of polarization (direction of vibration) of incident light, which totally transmits light of P wave (at a wavelength of 1.46 μm) emitted from the polarized light synthesizing collimator 510b, while totally reflecting light of S wave (at a wavelength of 1.46 μm) emitted from the polarized light synthesizing collimator 510a through the collimator lens 512a. The PBS 503 is such secured as to multiplex (polarization-synthesize) the pump light of S wave from the above polarized light synthesizing collimator 510a and the pump light of P wave from the polarized light synthesizing collimator 510b into light of the same optical axis, and emits the light to the WDM 504.

The second polarized light synthesizing unit 52 has a polarized light synthesizing collimators 510c and 510d, a HR 507 and a PBS 508, similarly to the first polarized light synthesizing unit 51. The polarized light collimators 510c and 510d are secured to the outer periphery of the casing 501. On the other hand, the collimator lenses 512c and 512d are secured inside the casing 501. Pump light inputted from the polarization maintaining optical fibers 511c and 511d is emitted to the inside of the casing 501 through the collimator lenses 512c and 512d.

The polarization maintaining optical fibers 511c and 511d are configured with birefringent optical fibers, each of which can transmit light at a wavelength of about 1.48 μm, for example, from a pumping light source not shown as linearly polarized light while maintaining a plane of polarization. The linearly polarized light that the polarization maintaining optical fibers 511c and 511d can propagate has electric field vectors pointing different directions. For example, the polarization maintaining optical fiber 511c propagates S wave, whereas the polarization maintaining optical fiber 511d propagates P wave.

The HR 507 totally reflects incident light, similarly to the HR 502, which is secured so as to emit the pump light of S wave at a wavelength of 1.48 $\mu$m inputted from the polarized light collimator 510c toward the PBS 508.

The PBS 508 has a property that a transmittance thereof is varied according to a plane of polarization (direction of vibration) of incident light, similarly to the PBS 503. The PBS 508 totally transmits light of P wave (at a wavelength of 1.48 $\mu$m) from the polarized light synthesizing collimator 510d, while totally reflecting light of S wave (at a wavelength of 1.48 $\mu$m) from the polarized light synthesizing collimator 510c.

The PBS 508 is secured so as to multiplex (polarization-synthesize) the pump light of S wave from the above polarized light synthesizing collimator 510c and the pump light of P wave from the polarized light synthesizing collimator 510d into the same optical axis. The polarization-synthesized pump light passes through the WDM 504 and the WDM 505, then is emitted to the signal light collimator 520.

The WDM 504 and 505 are chemical films each having a property that a transmittance thereof is varied according to a wavelength of incident light. The WDM 504 totally transmits light at a wavelength of 1.48 $\mu$m, while totally reflecting light at a wavelength of 1.46 $\mu$m. On the other hand, the WDM 505 totally transmits incident light at wavelengths of 1.48 $\mu$m and 1.46 $\mu$m from the WDM 504, while totally reflecting incident signal light (at a wavelength of, for example, about 1.55 $\mu$m) from the signal light collimator 510e.

Namely, the WDM 504 is disposed at such an angle as to direct a polarization-synthesized light at a wavelength of 1.46 $\mu$m emitted from the first polarized light synthesizing unit (namely, the PBS 503) to an optical axis of polarization synthesized light at a wavelength of 1.48 $\mu$m emitted from the second polarized light synthesizing unit 52 (namely, the PBS 508) toward the signal light collimator 520 and emit the light toward the signal light collimator 520. The WDM 504 totally transmits the incident polarization synthesized light at a wavelength of 1.48 $\mu$m from the PBS 508, while totally reflecting the incident polarization-synthesized light at a wavelength of 1.46 $\mu$m from the PBS 503, thereby wavelength-division-multiplexing the pump light so that the pump light has the same optical axis, and emits the pump light to the signal light collimator 520 through the WDM 505.

The WDM 505 multiplexes (wavelength-division multiplexes) the multiplexed light configured with the pump light (polarization-synthesized light) at a wavelength of 1.48 $\mu$m and the pump light (polarization-synthesized light) at a wavelength of 1.46 $\mu$m, and signal light (at a wavelength of 1.55 $\mu$m) emitted from the signal light collimator 510e, and emits the multiplexed signal light (including the pump light components) toward the signal light collimator 520.

The signal light collimator 520 has, similarly to the polarized light synthesizing collimators 510a through 510d, has an optical fiber 521 and a collimator lens 522. The signal light collimator 520 is disposed on the outer periphery of the casing 510, and the collimator lens 522 is disposed inside the casing 501, whereby the signal light passing through the collimator lens 522 is emitted to the optical fiber 521.

The signal light collimator 510e has, similarly to the polarized light synthesizing collimators 510a through 510d and the signal light collimator 520, an optical fiber 511e and a collimator lens 512e. The signal collimator 510e is disposed on the outer periphery of the casing 510, whereas the collimator lens 512 is disposed inside the casing 510, whereby the signal light emitted from the optical fiber 511e is converted into a collimated beam by passing through the collimator lens 512e, and emitted toward the WDM 505.

The isolator 506 is disposed on an optical axis of the signal light emitted from the signal light collimator 510e toward the WDM 505 to prevent resonance of the apparatus due to reflection of the signal light.

In the above structure, signal light is inputted to the optical fiber 511e of the signal light collimator 510e, and simultaneously pump light is emitted from the pumping lasers disposed to the polarized light synthesizing collimators 510a through 510d to the polarization maintaining optical fibers 511a through 511d. The first polarized light synthesizing unit 51 polarization-synthesizes pump light of S wave and P wave at a wavelength of 1.46 $\mu$m, whereas the second polarized light synthesizing unit 52 polarization-synthesizes pump light of P wave and S wave at a wavelength of 1.48 $\mu$m, further the WDM 504 wavelength-division-multiplexes the pump light. Signal light emitted from the signal light collimator 510e is wavelength-division-multiplexed over the wavelength-division-multiplexed pump light, then outputted from the signal light collimator 520 to an EDF not shown.

As the polarized light synthesizing unit for polarization-synthesizing pump light, there is known a polarized light synthesizer disclosed in Japanese Patent Laid-Open Publication No. 6-148570. The known polarized light synthesizer disclosed in the Japanese Patent Laid-Open Publication No. 6-148570 will be hereinafter described with reference to FIG. 12. FIG. 12 is a diagram schematically showing a structure of the polarized light synthesizer.

The polarized light synthesizer has, as shown in FIG. 12, birefringent crystals 3 and 6, a focusing rod lens 41, a high reflection mirror 5, input optical fibers 1 and 2, and a transmission fiber 7, which synthesizes linearly polarized light inputted through the input optical fibers 1 and 2, and outputs synthesized light from the transmission fiber 7.

The birefringent crystals 3 and 6 are uniaxial birefringent crystals such as rutile (TiO$_2$), crystal or the like. Inside the birefringent crystals 3 and 6, light porlarized in a direction of the optical axis advances straight as an ordinary ray, whereas light polarized in a direction perpendicular to the optical axis changes its path with an angle and advances as an extraodinary ray.

The input optical fibers 1 and 2 are connected to an end of the birefringent crystal 3. The input optical fibers 1 and 2 are polarization maintaining fibers each of which propagates light from a semiconductor laser (not shown) in a state where the light maintains linear polarization. At the other end of the birefringent crystal 3, there is connected an end of the focusing rod lens 41. The high reflection mirror 5 is adhered to the other end of the focusing rod lens 41. There is also connected the birefringent crystal 6 along with the birefringent crystal 3 to the other end of the focusing rod lens 41. The transmission fiber 7 is connected to the other end of the birefringent crystal 6.

In the above structure, when linearly polarized light from the semiconductor lasers not shown is inputted to the birefringent crystal 3 through the input optical fibers 1 and 2, the incident light from the input optical fibers 1 and 2 is separated into an ordinary ray and an extraordinary ray, and emitted to an end of the focusing rod lens 41.

The incident light is converted into parallel light by the focusing rod lens 41, after that, is reflected on a lens optical axis 8 of the high reflection mirror 5, again passes through the focusing rod lens 41, then is inputted to the birefringent crystal 6.

Inside the birefringent crystal 6, the incident light is again separated into an ordinary ray and an extraordinary ray and advances inside the crystal 6. Although the light separated into the ordinary ray and the extraordinary ray has advanced in the birefringent crystal 3, this time the ordinary ray is changed to the extroadinary ray and the extraordinary ray changed to the ordinary ray and advance in the birefringent crystal 6, and these rays are outputted in coincidence with each other from the other end of the biregrigent crystal 6 (the surface connected to the transmission fiber 7), then synthesized and coupled in the transmission fiber 7.

However, the pump light outputting apparatus shown in FIG. 11 requires polarization ports for P wave and S wave since the pump light outputting apparatus polarization-syntheses P wave and S wave at one wavelength. The device integrated polarization-synthesis and wavelength-synthesis therein requires a P polarization port for a short wavelength, an S polarization port for a short wavelength, a P polarization port for a long wavelength, an S polarization port for a long wavelength and an output port for outputting synthesized pump light, that is, 5 ports in total. The device is in a packaging size of L=about 90 mm and W=about 60 mm, for example. Therefore, it is impossible to realize a large decrease in packaging size only by integrating the functions.

In the polarized light synthesizer shown in FIG. 12, it is necessary to dispose the birefringent crystals 3 and 6 in a very small space between the input optical fibers 1 and 2 and the transmission fiber 7, and the focusing rod lens 41, so that a size of the birefringent crystal 3 and 6 has to be small and highly accurate dimensions are required in processing and assembling the device, which leads to a low productivity and a high manufacturing cost.

In assembling and fabricating the polarized light synthesizer shown in FIG. 12, the birefringent crystals 3 and 6, and the transmission fiber 7 are chemically adhered by adhesive not shown. However, the adhesive has a property of an inferior resistance to light since the adhesive is organic. In a state where light of a high power concentrates on a point within a very small area such as a core area of an optical fiber in, for example, an optical amplifier, the adhesive is easily damaged, thus the reliability is decreased. This causes harm when the apparatus is improved to have a high power, which is a fatal defect of the optical amplifier used essentially in an assumption that the optical amplifier operates with a high power (for example, light of high power such as 400 W concentrates on an area in diameter of about 10 $\mu$m when four types of light each of 100 mW are multiplexed).

SUMMARY OF THE INVENTION

In the light of the above problems, an object of the present invention is to provide a polarized light synthesizing apparatus, a polarized light splitting apparatus and a pump light outputting apparatus having a largely reduced packaging size while keeping functions as the known optical circuit device, a required resistance to light, reliability and readiness of fabrication, by improving the structure.

The present invention therefore provides a polarized light synthesizing apparatus comprising a lens assembly having a securing member for securing ends of a plurality of optical fibers each being able to propagate light having a different polarization component, and a lens converting a plural kinds of polarization component light emitted from the optical fibers into collimated beams, and a birefringent member for polarization-synthesizing the plural kinds of polarization component light as the same optical axis using a difference in refractive index characteristic between the plural kinds of polarization component light emitted from the lens.

The above polarized light synthesizing apparatus of this invention may accomplish polarization-synthesizing with one port, which leads to a reduction of packaging size and readiness of manufacturing. Further, it is possible to decrease a cost by decreasing the number of used members.

The securing member may be constructed to secure the two optical fibers being able to emit two kinds of light having orthogonal planes of polarization such that ends of the optical fibers get close to each other or contact with each other, and a planar birefringent crystal whose crystallographic axis is inclined at an acute angle to a direction of travel of the light may be provided as the birefringent member.

The above polarized light synthesizing apparatus of this invention may use a planer birefringent crystal as the birefringent member, so that a manufacturing cost may be reduced since the birefringent crystal is readily manufactured.

The securing member may be formed by joining two ferrule members securing the two optical fibers.

According to the above polarization synthesizing apparatus of this invention, the securing member may be readily manufactured, so that a manufacturing cost is decreased.

Alternatively, the securing member may be constructed to secure the above two optical fibers being able to emit two kinds of light having different orthogonal planes of polarization in parallel, and a tapered birefringent crystal whose crystallographic axis is perpendicular to an optical axis may be provided as the birefringent member.

According to the polarized light synthesizing apparatus of this invention, the securing member may be readily manufactured, so that a manufacturing cost may be decreased.

The plurality of optical fibers may be configured with polarization maintaining optical fibers being able to propagate plural kinds of light having different orthogonal planes of polarization while maintaining polarized states.

The above polarized light synthesizing apparatus of this invention may accomplish polarization-synthesizing with one port, which leads to a reduction of packaging size and readiness of manufacturing. Further, it is possible to decrease a cost by decreasing the number of used members.

A coupler film may be evaporated on a plane of incidence having a large angle of incidence among a plurality of planes of incidence of the tapered birefringent crystal into which the plural kinds of polarization component light incident, and a monitoring unit may be provided on an optical path of light reflected by the coupler film to monitor the plural kinds of polarization component light. The monitoring unit may have a photodiode monitoring a sum of components of the plural kinds of polarization component light.

The above polarized light synthesizing apparatus of this invention may control the polarization component light to obtain stable pump light outputs. Further, it is possible to prevent a phenomenon such that light is accumulatively amplified in repeating while passing through transmission paths and repeaters and the light having an excessive power is further increased when an optical signal is received by a terminal since an optical signal having an excessive power is not sent to an optical fiber, thus no effect is asserted on qualities of optical components receiving the optical signal in a receiving unit.

The monitoring unit may have a plurality of photodiodes monitoring the plural kinds of polarization component light separately.

The above polarized light synthesizing apparatus of this invention may separately control each polarization component light, thereby performing a pump light control in a higher level. Therefore, the present invention may provide a polarized light synthesizing apparatus with a high quality and high reliability.

The present invention further provides a polarized light splitting apparatus comprising a birefringent member for splitting plural different kinds of polarization components included in light emitted from one optical fiber into plural kinds of polarization component light using a difference in refractive index characteristic between the plural kinds of polarization component light, and a lens assembly having a lens for converting the polarization component light emitted from the birefringent member into collimated beams, and a securing member for securing ends of optical fibers being able to propagate the plural kinds of polarization component light collimated by the lens.

The above polarized light splitting apparatus of this invention may perform polarization-splitting with one port, so that a packaging size is decreased, and the apparatus is readily manufactured. It is further possible to decrease a cost by decreasing the number of used members.

The present invention still further provides a pump light outputting apparatus comprising a polarized light synthesizing unit for synthesizing light having different polarization components and having the same wavelength band to output the light synthesized by the polarized light synthesizing unit as pump light for optical amplification, the polarized light synthesizing unit comprising a lens assembly having a securing member for securing ends of a plurality of optical fibers being able to propagate light having different polarization components and a lens for converting plural kinds of polarization component light emitted from the optical fibers into collimated beams, and a birefringent member for polarization-synthesizing the plural kinds of polarization component light as the same optical axis using a difference in refractive index between the plural kinds of polarization component light emitted from the lens, and emitting the polarization-synthesized light in parallel to one output optical fiber different from the plurality of optical fibers.

According to the above pump light outputting apparatus of this invention, it is possible to decrease the number of ports, thereby to decrease a size of the whole apparatus and to readily manufacture the apparatus since pump light at each wavelength may be polarization-synthesized. Therefore, a low cost may be achieved by decreasing the number of used members.

The light synthesized by the polarized light synthesizing unit may be used as pump light for copropagating pumping or counterpropagating pumping for a remote optical amplifier connected to the output light optical fiber.

According to the above pump light outputting apparatus of this invention, an optical transmitting apparatus transmitting signal light for a long distance may have a small size, and be readily manufactured. It is therefore possible to achieve a low cost by decreasing the number of used members.

The above pump light outputting apparatus of this invention may further have a wavelength-division multiplexing/demultiplexing unit for performing a wavelength-division multiplexing process or a wavelength-division demultiplexing process on the light synthesized by the polarized light synthesizing unit and signal light including data information having a wavelengh different from a wavelength of the light synthesized by the polarized light synthesizing unit.

The above pump light outputting apparatus of this invention may perform wavelength-division multiplexing or wavelength-division demultiplexing within the same apparatus, which leads to a decrease of a size of the apparatus, and a simplified structure. It is therefore possible to decrease a cost by decreasing the number of used members.

The present invention still further provides a pump light outputting apparatus comprising a first polarized light synthesizing unit which may synthesize first pump light having a first wavelength band while having different polarization components, a second polarization synthesizing unit which may synthesize second pump light having a second wavelength band different from the first wavelength band while having different polarization components, a multiplexing unit for multiplexing the pump lights emitted from the first polarized light synthesizing unit and the second pump light synthesizing unit such that said pump light outputting apparatus may output said light multiplexed by the multiplexing unit as pump light for optical amplification through an output optical fiber, the first polarized light synthesizing unit comprising a first lens assembly having a first securing member for securing ends of a plurality of first pumping optical fibers being able to propagate light having different polarization components while having the first wavelength band, and a first lens for converting the plural kinds of polarization component light emitted from the first pumping optical fibers into collimated beams, a first birefringent member for polarization-synthesizing the plural kinds of polarization component light as the same optical axis using a difference in refractive index characteristic between the plural kinds of polarization component lights emitted from the first lens, and emitting the light, the second polarized light synthesizing unit comprising a second lens assembly having a second securing member for securing ends of a plurality of second pumping optical fibers being able to propagate light having different polarization components while having the second wavelength band, and a second lens for converting the plural kinds of polarization component light emitted from the second pumping optical fibers into collimated beams, and a second birefringent member for polarization-synthesizing the plural kinds of polarization component light as the same optical axis using a difference in refractive index characteristic between the plural kinds of polarization component light emitted from the second lens, and emitting the light.

According to the above pump light outputting apparatus of this invention, it is possible to decrease a size of the whole apparatus and configure the apparatus with a simplified structure, thus a cost may be decreased by decreasing the used members.

The light multiplexed by the multiplexing unit may be used as pump light for copropagating pumping or counter-propagating pumping for a remote optical amplifier connected through the output optical fiber.

According to the above pump light outputting apparatus of this invention, it is possible to decrease a size of a optical transmitting apparatus transmitting signal light for a long distance and configure the apparatus with a simplified structure. Thus, a low cost may be achieved by decreasing the number of used members.

The above pump light outputting apparatus may further have a wavelength-division multiplexing/demultiplexing unit for performing a wavelength-division multiplexing process or a wavelength-division demultiplexing process on the light multiplexed by the multiplexing unit and signal light including data information while having a wavelength different from a wavelength of the light multiplexed by the multiplexing unit.

According to the above pump light outputting apparatus of this invention, it is possible to decrease a size of the apparatus and configure the apparatus with a simplified structure, thus the number of used members is decreased, which leads to a low cost.

BRIEF DESCRIPTION OF THE DRAWINGS

FIG. 7 is a sectional view schematically showing a structure of a first modification of the polarized light synthesizing apparatus according to the first embodiment of this invention;

DESCRIPTION OF THE PREFERRED EMBODIMENTS

Hereinafter, description will be made of embodiments of this invention with reference to the drawings.

Figure 2:
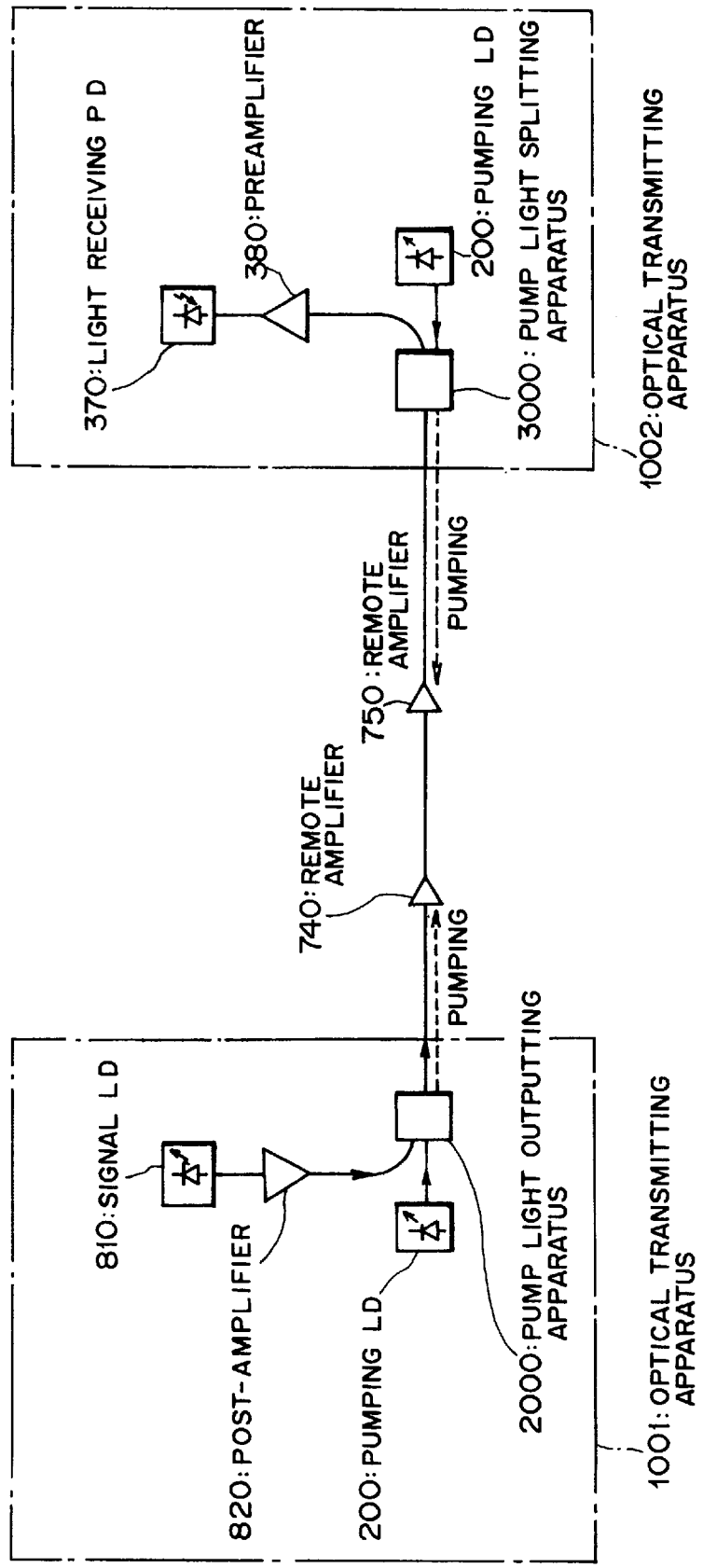
FIG. 2 is a diagram schematically showing an optical communication system to which a pump light outputting apparatus according to the first embodiment of this invention is applied.

(A) Description of a First Embodiment of the Invention (a) Description of an Optical Transmitting Apparatus FIG. 2 is a diagram schematically showing a structure of an optical communication system to which a pump light outputting apparatus according to a first embodiment of this invention is applied. The pump light outputting apparatus according to the first embodiment of this invention is applied to each of optical transmitting apparatus in an optical communication system for optical communication, which are installed on the ground facing each other with a sea therebetween, as shown in FIG. 2, for example. The optical communication system shown in FIG. 2 has an optical transmitting apparatus (sending terminal) 1001, an optical transmitting apparatus (receiving terminal) 1002 and remote amplifiers 740 and 750.

The optical transmitting apparatus 1001 has a signal LD (Laser Diode) 810, a post-amplifier 820, a pump light outputting apparatus 2000, a pumping LD 200, which performs a wavelength-division multiplexing process on signal light including data information generated by the signal LD 810, pump light at a wavelength of about 1.48 μm and pump light at a wavelength of about 1.46 μm outputted from the pumping LD 200, and counterpropagating-pumps the remote amplifier 740 (remote optical amplifier).

The optical transmitting apparatus 1002 has a light receiving PD (Photo Diode) 370, a preamplifier 380, a pump light splitting apparatus 3000 and a pumping LD 200, which copropagating-pumps the remote amplifier with pump light at awavelength of about 1.48 μm and pump light at a wavelength of about 1.46 μm outputted from the pumping LD 200, and performs a wavelength splitting process on received light to separate the signal light including the data information.

The remote amplifiers 740 and 750 are installed in the course of a very-long-distance transmission system such as an submarine cable or the like, each of which is an optical amplifier with a simplified structure consisting of only an EDF (Erbium-Doped Optical Fiber) and without an electric circuit, thus requiring no power supply.

In the optical transmitting apparatus 1001 with the above structure, signal light to be transmitted is inputted from the signal LD 810 to the post-amplifier 820, amplified by the post-amplifier 820, then inputted to the pump light outputting apparatus 2000. At the same time, pump light is inputted from the pumping LD 200 to the pump light outputting apparatus 2000, and multiplexed over the signal light in the pump light outputting apparatus 2000. The multiplexed light is transmitted to the remote amplifier 740 to counterpropagating-pump the remote amplifier 740. The signal light is amplified by the remote amplifier 740, after that, transmitted to the remote amplifier 750.

In the optical transmitting apparatus 1002, pump light is inputted from the pumping LD 200 to the pump light splitting apparatus 3000, and transmitted to the remote amplifier 750 from the pump light splitting apparatus to copropagating-amplify the remote amplifier 750. The signal light is amplified by the remote amplifier 750, and transmitted to the pump light splitting apparatus 3000.

In the pump light splitting apparatus 3000, the signal light is separated from the pump light, amplified by the preamplifier 380, after that, converted into an electric signal in the light receiving PD 370.

In the above optical transmitting apparatus, when signal light is transmitted for a distance of 50 km using an optical fiber whose transmission loss is 0.2 dB/km, for example, attenuation of 10 dB is generated, in general. However, it is possible to compensate a loss of signal light on a transmission path by amplifying the signal light by the remote amplifiers 740 and 750 installed in remote places using low-loss pump light obtained in polarization synthesis and wavelength synthesis (wavelength multiplexing) from the pump light outputting apparatus 2000 and the pump light splitting apparatus 3000 to be described later.

(b) Description of the Pump Light Outputting Apparatus

Figure 3:
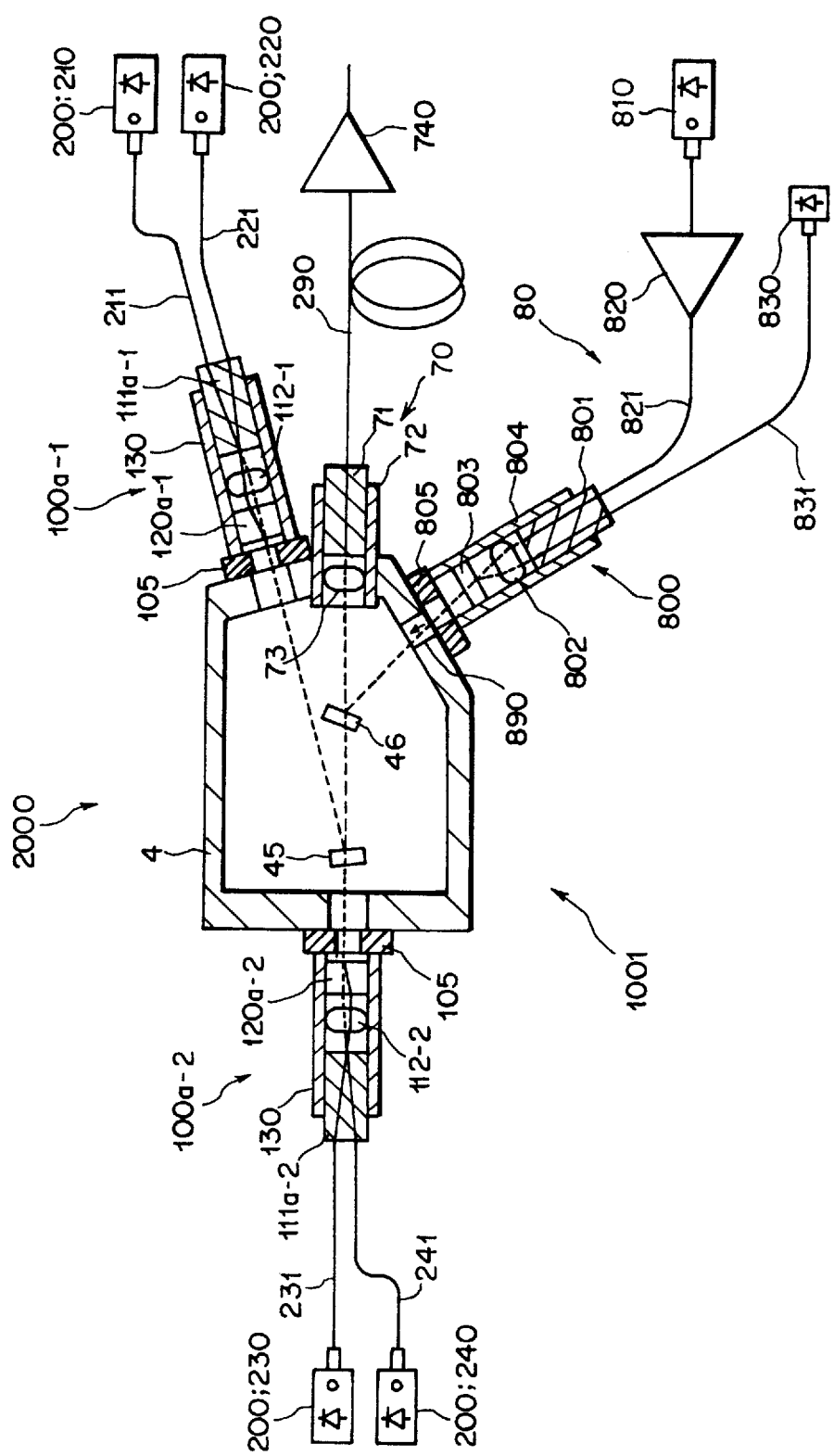
FIG. 3 is a sectional view schematically showing the pump light outputting apparatus according to the first embodiment of this invention.

The above optical transmitting apparatus 1001 has a structure shown in detail in FIG. 3.

In the optical transmitting apparatus 1001 shown in FIG. 3, the pump light outputting apparatus 2000 has pump light synthesizing units 100a-1 and 100a-2, a casing 4, a signal inputting unit 80, a signal light emitting unit 70 and pumping LDs 210 through 240 (like reference characters in FIG. 3 designate like or corresponding parts in FIG. 2).

The pump light synthesizing unit 100a-1 and 100a-2, the signal inputting unit 800 and the signal light emitting unit 70 are disposed on the outer wall of the casing 4. A synthesizing film 45 and a WDM film 46 are disposed inside the casing 4.

The signal inputting unit 80 has a signal collimator 800, a signal light LD 810, an optical amplifier (post-amplifier) 820, a light receiving PD 830 and optical fibers 821 and 831.

The optical amplifier 820 is disposed on an end of the optical fiber 821, to which the signal light LD 810 for outputting signal light (for example, signal light at a wavelength of about 1.55 μm according to the first embodiment) including data information is connected. The signal light including data information outputted from the signal light LD 810 is amplified by the optical amplifier 820, then inputted to the signal collimator 800 through the optical fiber 821.

The signal collimator 800 has a ferrule 801, a collimator lens 802, a lens holder 804 and a coupler film 803. The other end of the optical fiber 821 and an end of the optical fiber 831 are secured in parallel to the ferrule 801.

The collimator lens 802 for collimating the signal light is disposed on the downstream of the ferrule 801 (on the side of the casing 4). Further, the coupler film 803 is disposed on the downstream of the collimator lens 802. The coupler film 803 reflects a part of the incident signal light. The optical fibers 821 and 831 are equally spaced from the center axis of the collimator lens 802. A part of the signal light reflected by the coupler film 803 is emitted to optical fiber 831, then emitted to the photocoupler 803 through the optical fiber 831.

The lens holder 804 is manufactured from a stainless pipe, etc., which secures the ferrule 801, the collimator lens 802 and the coupler film 803.

The signal collimator 800 is secured to the casing 4 through a spacer 805 by welding or the like to emit the signal light toward the inside of the casing 4. An isolator 890 is disposed in the casing 4 at a position where the signal collimator 800 is attached to prevent resonance of the apparatus due to reflection of the signal light emitted toward the casing from the signal collimator 800.

The signal light emitting unit 70 outputs the pump light and the signal light synthesized in the casing 4 to a transmission path fiber 290, which has a ferrule 71, a collimator lens 73 and a lens holder 72.

An end of the ferrule 71 is secured in such a way that an end of the transmission path fiber 290 positions on a center axis of the collimator lens 73. The collimator lens 73 is disposed such that a center axis thereof positions on output signal light emitted from the inside of the casing 4 (WDM filem 46), thereby collimating the output signal light emitted from the WDM film 46 and emitting the signal light to the transmission path fiber 290.

The lens holder 72 is manufactured from a stainless pipe, etc., which secures the ferrule 71 and the collimator lens 73, while securing the signal light emitting unit 70 to the casing 4. The signal light emitting unit 70 is disposed on the other wall of the casing 4 such that a center axis of the collimator lens 73 thereof positions on a center axis of the pump light synthesizing unit 100a-2.

Figure 1:
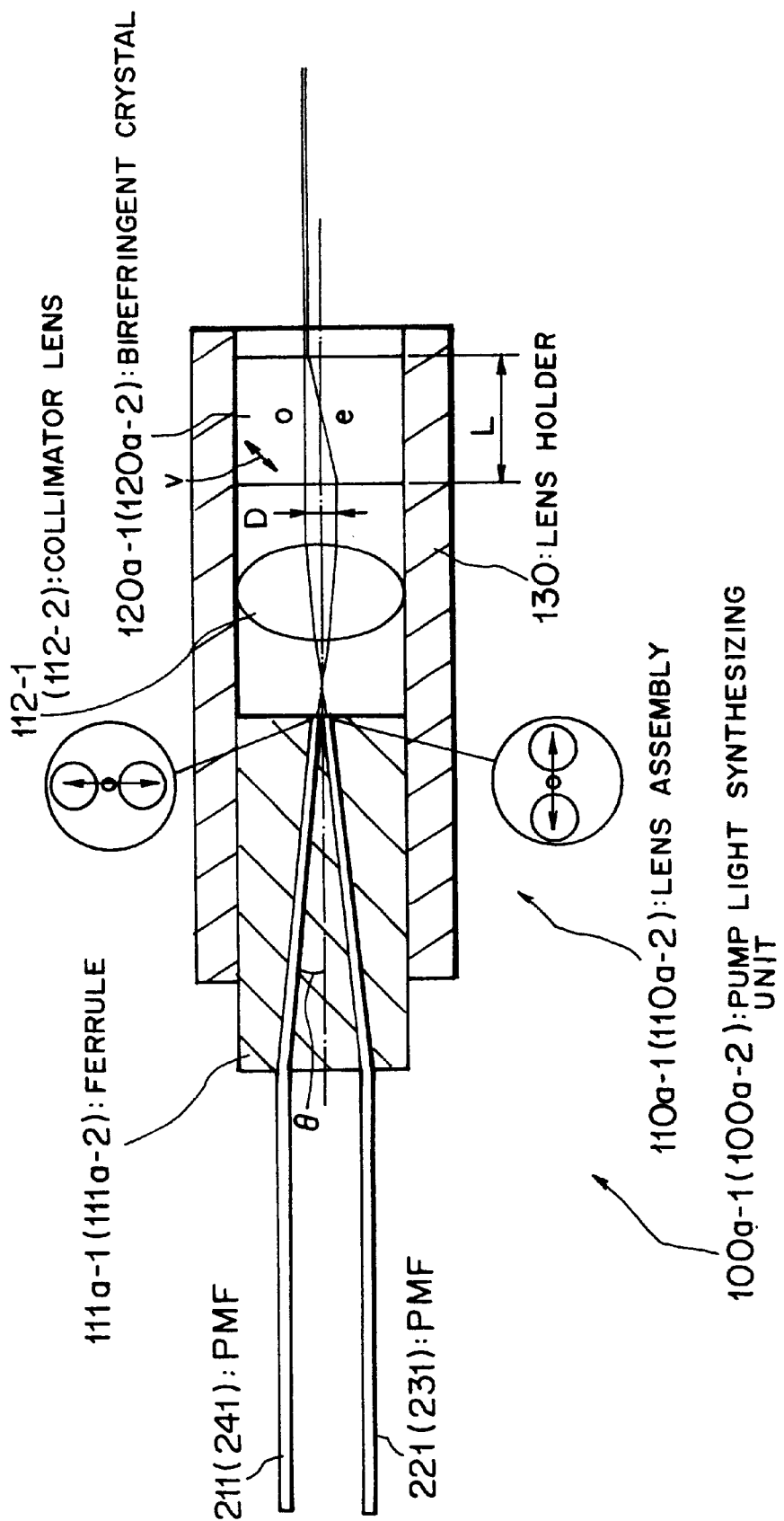
FIG. 1 is a sectional view schematically showing a structure of a polarized light synthesizing apparatus according to a first embodiment of this invention.

Now, description will be made of the pump light synthesizing units 100a-1 and 100a-2, that is, the polarized light synthesizing apparatus according to the first embodiment of this invention, with reference to FIG. 1. FIG. 1 is a sectional view schematically showing a structure of the polarized light synthesizing apparatus according to the first embodiment of this invention.

The pump light synthesizing unit 100a-1 functions as a first polarized light synthesizing unit which can synthesize first pump light having a first wavelength band while having polarization components different from each other. To the pump light synthesizing unit 100a-1, polarization maintaining optical fibers (PMFs) 211 and 221 are connected, which are two optical fibers being able to propagate light of orthogonal polarization components. The other ends of the PMF 211 and PMF 221 are connected to pumping LDs 210 and 220 outputting pump light at a wavelength of 1.46 μm which is a first wavelength band, respectively.

The pump light synthesizing unit 100a-2 functions as a second polarized light synthesizing unit which can synthesize second pump light having a second wavelength band different from the first wavelength band, while having polarization components different from each other. To the pump light synthesizing unit 100a-2, PMFs 231 and 241 are connected, which are two optical fibers being able to propagate light of orthogonal polarization components. The other ends of the PMF 231 and the PMF 241 are connected to pumping LDs 230 and 240 outputting pump light at a wavelength of 1.48 μm which is a second wavelength band, respectively.

The pump light synthesizing unit 100a-1 has, as shown in FIG. 1, a lens assembly 100a-1, a birefringent crystal 120a-1 and a lens holder 130. The lens assembly 110a-1 has a ferrule 111a-1 and a collimator lens 112-1.

The ferrule 111a-1 is a first securing member which secures ends of the PMFs 211 and 221. The ferrule 111a-1 inclines the PMFs 211 and 221 (at an angle θ) (for example, θ=6°, in the first embodiment) in such a way that ends of the PMFs 211 and 221 come close to each other or come in contact with each other, and secures the PMFs 211 and 221, in order to emit light having orthogonal planes of polarization. At this time, the PMFs 211 and 221 are symmetrical with respect to a center axis of the collimator lens 112-1.

Figure 6A:
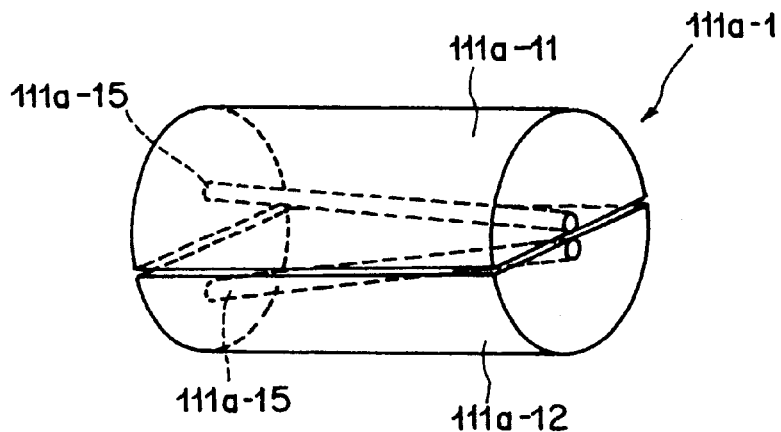
FIGS. 6(a) through 6(c) are diagrams for illustrating a structure of a securing member.
Figure 6B:
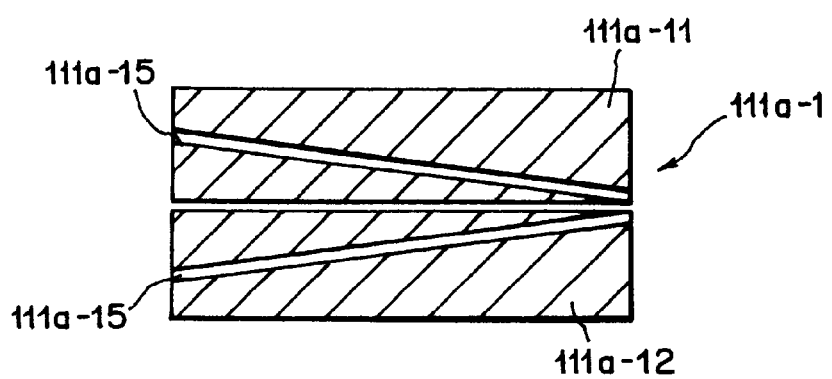
Figure 6C:
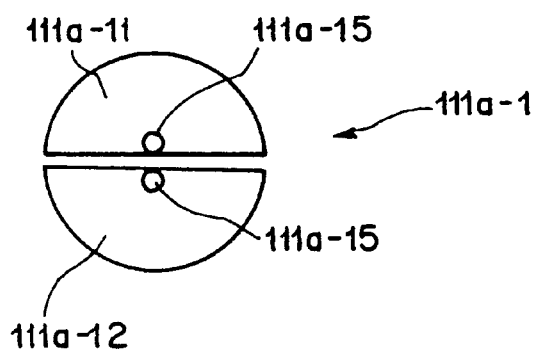

The ferrule 111a-1 is formed by joining semi-cylindrical ferrules 111a-11 and 111a-12 which are two ferrule members, as shown in FIGS. 6(a) through 6(c). These ferrules 111a-11 and 111a-12 are made of ceramic or the like.

In the semi-cylindrical ferrules 111a-11, a hole 111a-15 is formed to secure the PMF 211. Similarly, a hole 111a-15 is formed in the semi-cylindrical ferrule 111a-12 to secure the PMF 221.

The holes 111a-15 may be formed in each of the semi-cylindrical ferrules 111a-11 and 111a-12 in such a manner that the ceramic is sintered with wires each having a diameter approximately equal to those of the PMFs 211 and 221 being inserted when each of the semi-cylindrical ferrules 111a-11 and 111a-12 are formed, after that, the wires are pulled out.

The collimator lens 112a-1 is a first lens (for example, a sphere lens having a diameter of 2.5 mm in the first embodiment) for converting light of two kinds of polarization components emitted from the PMFs 211 and 221 into collimated beams. The collimator lens 112a-1 is disposed on the downstream of the ferrule 111a-1 (on the right side in FIG. 1) such that two kinds of incident pump light from the PMFs 211 and 221 are in parallel to each other after passing through the collimator lens 112a-1.

The birefringent crystal 120a-1 is a uniaxial birefringent crystal such as rutile ($TiO_2$) or the like, having a property that a refractive index thereof varies according to a direction of vibration (plane of polarization) of light with respect to a crystallographic axis of the same. The birefringent crystal 120a-1 functions as a first birefringent member for polarization-synthesizing polarization component light as light having the same optical axis using a difference in refractive index property among the plural kinds of polarization component light emitted from the collimator lens 112-1.

Namely, when the light having two kinds of polarization components emitted from the PMFs 211 and 221 passes through the birefringent crystal 120a-1, light (ordinary ray) having a plane of polarization perpendicular to the crystallographic axis v of the birefringent crystal 120a-1 is prone to go straight since the light has a small refractive index, whereas light (extraordinary ray) having a plane of polarization in parallel to the crystollographic axis v of the birefringent crystal 120a-1 passes through with a large angle.

The birefringent crystal 120a-1 is a planar birefringent crystal whose crystallographic axis v is inclined at an acute angle to a direction of travel of incident light, which is disposed on the downstream (on the right side in FIG. 1) of the collimator lens 112-1.

A length (for example, 4 mm in the first embodiment) of the birefringent crystal 120a-1 in the direction of the crystallographic axis of the collimator lens 112 is determined according to an angle θ (6° in the first embodiment) of each of the PMFs 211 and 221 to the axis of the collimator lens 112-1 and a clearance D (0.4 mm in the first embodiment, for example) between the beams when coming into the birefringent crystal 120a-1 such that the beams are multiplexed into the same optical axis such when the light having entered the birefringent crystal 120a-1 comes out from the opposite surface of the birefringent crystal 120a-1.

In the first embodiment shown in FIG. 1, the crystallographic axis v of the birefringent crystal 120a-1 is inclined at an acute angle (45° in the first embodiment, for example) to a direction of travel of the incident light. The crystallographic axis v is perpendicular to the plane of polarization of the PMF 221, while being in parallel to the plane of polarization of the PMF 211. The light emitted from the PMF 211 passes as an extraordinary ray (refer to reference character e in FIG. 1) through the birefringent crystal 120a-1, while the light emitted from the PMF 221 passes as an ordinary ray (refer to reference character o in FIG. 1) through the birefringent crystal 120a-1.

The lens holder 130 is manufactured from a stainless pipe,etc., which secures the ferrule 111a-1, the collimator lens 112-1 and the birefringent crystal 120a-1. The lens holder 130, the collimator lens 112-1 and the birefringent crystal 120a-1 are fixed by a low-melting glass, an adhesive or the like. The lens holder 130 and the ferrule 111a-1 are focused with the collimator lens 112-1, after that, fixed by welding or the like.

The beams of light (pump light) emitted from the pumping LDs 210 and 220 to the PMFs 211 and 221 come into the collimate lens 112-1 from positions equal distances away from the center axis of the collimator lens 112-1 in a state where the beams have orthogonal planes of polarization, become collimated beams in parallel to the optical axis of the collimator lens 112-1, and are emitted to a surface of the birefringent crystal 120a-1.

In the birefringent crystal 120a-1, the beam emitted from the PMF 221 passes as an ordinary ray with a high linearity through the birefringent crystal 120a-1, whereas the beam emitted from the PMF 211 is largely reflected and passes as an extraordinary ray through the birefringent crystal 120a-1. These beams are polarization-synthesized on the other surface of the birefringent crystal 120a-1, and emitted as light having the same optical axis.

A polarized light synthesizing collimator 100a-1 is secured to the casing 4 through the spacer 105 by welding or the like, which emits the polarization-synthesized pump light toward the inside of the casing 4.

A pump light synthesizing unit 100a-2 has the same structure as the pump light synthesizing unit 100a-1, as indicated by a reference character in parentheses in FIG. 1, which can output light obtained by polarization-synthesizing the beams whose planes of polarization are orthogonal as pump light of 1.48 μm as the second wavelength band.

A ferrule 111a-2 corresponds to a second securing member, a collimator lens 112-2 a second lens, a birefringent crystal 120a-2 a second birefringent member, PMFs 241 and 231 second pumping optical fibers, and a ferrule 111a-2 and collimator lenses 112-2 a second lens assembly.

The polarized light synthesizing collimator 100a-2 is secured to the casing 4 through the spacer 105 by welding or the like, which emits polarization-synthesized pump light to the inside of the casing 4.

In the pump light outputting apparatus 2000 shown in FIG. 3, the synthesizing film 45 functions as a multiplexing unit for multiplexing the pump light emitted from the pump light synthesizing unit 100a-1 and the pump light emitted from the pump light synthesizing unit 100a-2. The synthesizing film 45 is securely disposed such that a reflection plane of the synthesizing film 45 is positioned at an intersection of an optical axis of the polarization-synthesized pump light at an wavelength of 1.48 μm emitted from the pump light synthesizing unit 100a-1 and an optical axis of the polarization-synthesized pump light at a wavelength of 1.46 μm emitted from the pump light synthesizing unit 100a-2, and at an angle such as to emit the pump light emitted from the pump light synthesizing unit 100a-1 toward a center of the collimator lens 73 in the signal light emitting unit 70.

Figure 5A:
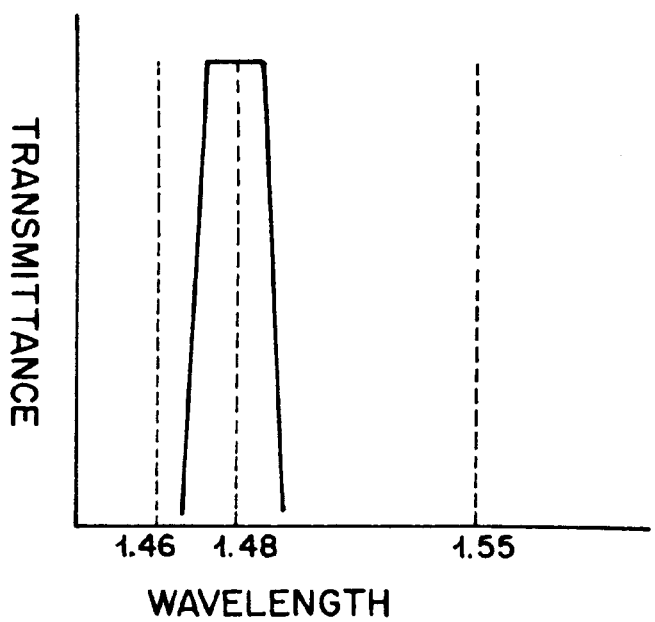
FIGS. 5(a) and 5(b) are diagrams for illustrating transmission characteristics of a synthesizing film and a WDM film, respectively.
Figure 5B:
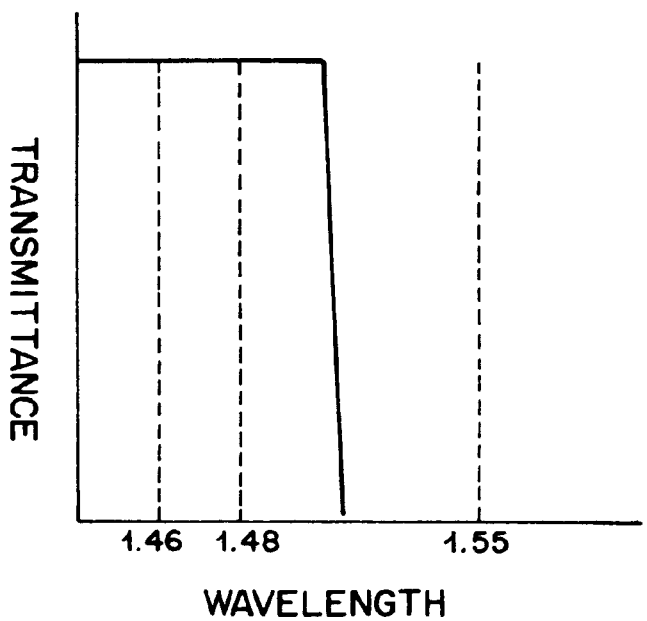

FIGS. 5(a) and 5(b) are diagrams for illustrating transmission characteristics of the synthesizing film 45 and the WDM film 46. FIG. 5(a) shows a relation between wavelength and transmittance of the synthesizing film 45, whereas FIG. 5(b) shows a relation between wavelength and transmittance of the WDM film 46.

The synthesizing film 45 is a optical film having a property that a transmittance thereof is varied according to a wavelength of incident signal light, which totally transmits light at a wavelength of 1.46 μm while totally reflecting light at a wavelength of 1.48 μm, as shown in FIG. 5(a)). Namely, the synthesizing film 45 totally transmits the polarization-synthesized pump light at a wavelength of 1.46 μm emitted from the pump light synthesizing unit 100a-2, while totally reflecting the polarization-synthesized pump light at a wavelength of 1.48 μm emitted from the pump light synthesizing unit 100a-1, and emits the above two kinds of pump light as light of the same optical axis to the WDM film 46, thereby multiplexing the above two kinds of pump light.

The WDM film 46 is a optical film having a property that a transmittance thereof is varied according to a wavelength of incident signal light, which totally reflects light at wavelengths of 1.46 μm and light at a wavelength of 1.48 μm, while totally transmitting light at a wavelength of 1.55 μm.

Namely, the WDM film 46 wavelength-multiplexes signal light at a wavelength of 1.55 μm from the signal collimator 800 over the two kinds of pump light at wavelengths of 1.46 μm and 1.48 μm multiplexed by the synthesizing film 45, which functions as a wavelength-division multiplexing/demultiplexing unit.

The optical transmitting apparatus 1001 according to the first embodiment can transmit the signal light generated by the signal LD 810 along with the pump light (polarization-synthesized and wavelength-division multiplexed) for pumping the remote amplifier 740 in wavelength-division multiplexing.

The transmission path fiber 290 is laid on the bottom of an ocean between continents, for example, which is served to exchange an optical signal between the optical transmitting apparatus 1001 and the optical transmitting apparatus 1002 via the remote amplifiers 740 and 750.

Figure 4:
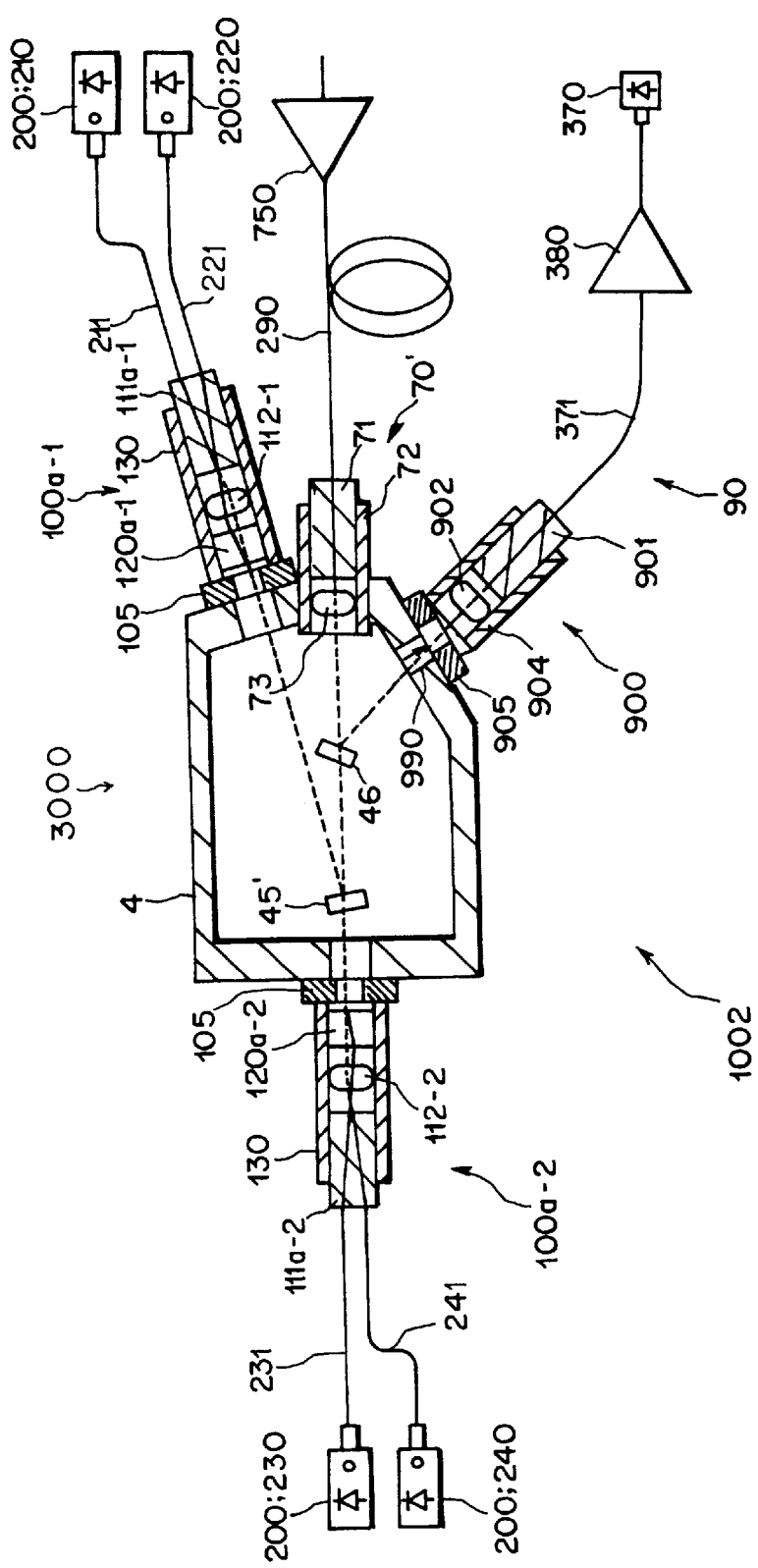
FIG. 4 is a sectional view schematically showing a structure of a pump light splitting apparatus (optical transmitting apparatus) using a polarized light splitting apparatus according to the first embodiment of this invention.

Next, description will be made of a structure of the pump light splitting apparatus 3000 in the optical transmitting apparatus 1002 shown in FIG. 2 with reference to FIG. 4. FIG. 4 is a sectional view showing in detail a structure of the optical transmitting apparatus 1002. The pump light splitting apparatus 3000 in the optical transmitting apparatus 1002 shown in FIG. 4 has a signal outputting unit 90 instead of the signal inputting unit 80, when compared with the pump light outputting apparatus 2000 in the above optical transmitting apparatus 1001. In concrete, the pump light splitting apparatus 3000 has the same structure as the pump light outputting apparatus 2000 excepting directions of isolators (890 and 990), the other parts of which are similar to those of the pump light outputting apparatus 2000 shown in FIG. 3.

In FIG. 3, like reference characters designate like or corresponding parts, descriptions of which are thus omitted.

The pump light splitting apparatus 3000 shown in FIG. 4 has a splitting film 45' and a signal light inputting unit 70', which are similar to the synthesizing film 45 and the signal emitting unit 70 in the pump light outputting apparatus 2000 shown in FIG. 3, descriptions of which are thus omitted.

A signal outputting unit 90 has a signal collimator 900, an optical amplifier (preamplifier) 380, a light receiving PD 370 and an optical fiber 371.

The signal collimator 900 is secured to the casing 4 through a spacer 905 by welding or the like. At a position in the casing 4 where the signal collimator 900 is attached, an isolator 890 is disposed to prevent resonance of the apparatus generated due to reflection of signal light emitted toward the signal collimator 900.

The signal collimator 900 has a ferrule 901, a collimator lens 902 and a lens holder 904. The ferrule 901 secures the optical fiber 371 and the collimator lens 902 such that an end of the optical fiber 371 is aligned to a center axis of the collimator lens 901.

The optical amplifier 380 is disposed at the other end of the optical fiber 371. The light receiving PD 370 is disposed at the optical amplifier 380. Signal light amplified by the optical amplifier 380 is inputted to the light receiving PD 370.

The collimator lens 902 is disposed on the upstream of the ferrule 901 (on the side of the casing 4) to convert the signal light into collimated beams.

The lens holder 904 is manufactured from a stainless pipe, etc., which secures the ferrule 901 and the collimator lens 902.

Hereinafter, description will be made of an operation of the first embodiment with the above structure according to this invention. The signal light LD 810 in the optical transmitting apparatus 1001 emits signal light including data information toward the optical amplifier 820. The optical amplifier 820 amplifies the signal light, then outputs the signal light to the signal collimator 800 through the optical fiber 821.

The signal light inputted to the signal collimator 800 is first emitted to the collimator lens 802 to be converted into collimated beams, then emitted to the coupler film 803 at a predetermined incident angle. A part of components of the signal light emitted to the coupler film 803 is reflected by a surface of the coupler film 803, then emitted to the photocoupler 830 through the optical fiber 831. On the other hand, the remaining components of the signal light pass through the coupler film 803, pass through the isolator 890, then are emitted to the WDM film 46.

The photocoupler 830 monitors a part of the signal light, and a signal light control apparatus not shown controls the signal light LD 810, thereby keeping an optical level of the signal light constant. Therefore, it is possible to configure an optical transmitting apparatus with high reliability.

As soon as the signal light is emitted from the signal light LD 810, the pumping LDs 210 through 240 emit pump light toward the PMFs 211 through 241, respectively.

The two pumping LDs 210 and 220 emit pump light at a wavelength of 1.46 μm (first pump light) toward the pump light synthesizing unit 100a-1 through the PMFs 211 and 221. The pump light emitted from the pumping LDs 210 and 220 passes through the PMFs 211 and 221 so as to be orthogonal polarization component light, and comes into the pump light synthesizing unit 100a-1.

The two kinds of pump light at a wavelength of 1.46 μm, which are orthogonal polarization component light, emitted from the pumping LDs 210 and 220 are polarization-synthesized to be of the same optical axis by the pump light synthesizing unit 100a-1, then emitted toward the synthesizing film 45.

On the other hand, the pumping LDs 230 and 240 emit pump light at a wavelength of 1.48 μm (second pump light) toward the pump light synthesizing unit 100a-2 through the PMFs 231 and 241. The pump light emitted from the pumping LDs 230 and 240 passes through the PMF 231 and 241 to be orthogonal polarization component light, then is emitted to the pump light synthesizing unit 100a-2.

The two kinds of pump light at a wavelength of 1.48 μm, which are orthogonal polarization component light, are polarization-synthesized to be of the same optical axis by the pump light synthesizing unit 100a-2, then emitted toward the signal light emitting unit 70.

The polarization-synthesized pump light at a wavelength of 1.48 μm emitted from the pump light synthesizing unit 100a-2 is emitted to a surface (the left surface in FIG. 3) of the synthesizing film 45, and is totally transmitted through the synthesized film 45.

The polarization-synthesized pump light at a wavelength of 1.46 μm emitted from the pump light synthesizing unit 100a-1 is emitted to the other surface (the right surface in FIG. 3) of the synthesizing film 45, totally reflected by the surface of the synthesizing film 45, multiplexed with the polarization-synthesized pump light at a wavelength of 1.48 μm emitted from the pump light synthesizing unit 100a-2 to be of the same optical axis, then is emitted toward the signal light emitting unit 70.

The pump light multiplexed as above passes through the WDM film 46 on the way to the signal emitting unit 70 to be emitted, at which time the pump light is wavelength-division-multiplexed over the signal light emitted from the above signal collimator 800 by the WDM film 46. Namely, the multiplexed pump light (the pump light at a wavelength of 1.46 μm and the pump light at a wavelength of 1.48 μm) comes into the WDM film 46 from a surface thereof (the left surface in FIG. 3), and is totally transmitted through the WDM film 46.

On the other hand, the signal light emitted from the signal collimator 800 is emitted on the other surface of the WDM film 46, totally reflected by the surface of the WDM film 46, wavelength-division-multiplexed to be of the same optical axis as the multiplexed pump light totally transmitted through the WDM film 46, then emitted to the signal light emitting unit 70.

The wavelength-division-multiplexed light of the pump light and the signal light emitted toward the signal light emitting unit 70 passes through the collimator lens 73 to be converted into collimated beams, then outputted to the transmission path fiber 290 as an output of the optical transmitting apparatus 1001. The wavelength-division-multiplexed light is inputted to the remote amplifier 740 through the transmission path fiber 290, and only the pump light in the wavelength-division-multiplexed light configured with the signal light and the pump light is used as pump light for copropagating pumping to amplify the signal light.

The signal light amplified by the remote amplifier 740 is sent to the remote amplifier 750 over the transmission path fiber 290, further, amplified by the pump light (polarization-synthesized and wavelength-division-multiplexed) for counterpropagating pumping from the pump light splitting apparatus 3000, then transmitted to the optical transmitting apparatus 1002.

The signal light amplified by the remote amplifier 750 is emitted to the collimator lens 73 in the signal light inputting unit 70' in the optical transmitting apparatus 1002 through the transmission path fiber 290, and emitted on the WDM film 46 as collimated beams by passing through the collimator lens 73.

The signal light at a wavelength of 1.55 μm in the light emitted to the WDM film 46 is totally reflected by the surface of the WDM film 46, and emitted toward the signal collimator 900. The totally reflected signal light at a wavelength of 1.55 μm passes through the isolator 990, is emitted to the collimator lens 902, is converted into collimated beams by passing through the collimator lens 902, then emitted to the optical fiber 371.

The signal light at a wavelength of 1.55 μm emitted to the optical fiber 371 is amplified by the optical amplifier 380, and demodulated-converted into an electric signal by the light receiving PD 370 to be used as data information in a signal processing system in the rear stage.

The optical transmitting apparatus 1002 emits the pump light from the pumping LDs 210 through 240 to the PMFs 211 through 241, polarization-synthesizes pump light at a wavelength of 1.46 μm in the pump light synthesizing unit 100*a*-1 while polarization-synthesizing pump light at a wavelength of 1.48 μm in the pump light synthesizing unit 100*a*-2, wavelength-division-multiplexes the two kinds of polarization-synthesized pump light by the synthesizing film 45, and emits the wavelength-division-multiplexed light from the signal light inputting unit 70' to the transmission path fiber 290. The pump light is inputted to the remote amplifier 750 through the transmission path fiber 290 to copropagating-pump the remote amplifier 750.

According to the first embodiment of this invention, the pump light outputting apparatus polarization-synthesizes pump light at a wavelength of 1.46 μm using the pump light synthesizing unit 100*a*-1 and synthesizes pump light at a wavelength of 1.48 μm using the pump light synthesizing unit 100*a*-2, whereby the number of polarization ports is decreased. Therefore, it is possible to polarization-synthesize pump light at each wavelength in a small and simplified apparatus, which leads to a reduction in size of the whole apparatus. For example, the apparatus can be configured in packaging dimensions of L=approximately 80 mm and W=approximately 40 mm.

The reduction in size and the simplified structure lead to a low cost by decreasing the number of used members.

Further, the pump light outputting apparatus is provided with the WDM film 46 for wavelength-division-multiplexing/demultiplexing. This means that it is possible to perform wavelength-division-multiplexing and wavelength-division-demultiplexing in the same apparatus, which leads to a reduction of the size and the simplified structure of the apparatus. It is thereby possible to decrease a cost by decreasing the number of used members.

Still further, according to the first embodiment of this invention, the polarized light synthesizing apparatus polarization-synthesizes two kinds of light emitted from the PMFs 211 (241) and 221 (231) by the lens assembly 110*a*-1 (110*a*-2) and the birefringent crystal 120*a*-1 (120*a*-2) using a difference in refractive index between the two kinds of polarization component light, thereby realizing polarization-synthesis with one port. It is therefore possible to decrease packaging dimensions, readily fabricate the apparatus and decrease a cost by decreasing the number of used members.

(B) Description of a First Modification of the First Embodiment of the Invention Each of the pump light synthesizing units 100*a*-i and 100*a*-2 (refer to FIG. 3) as the polarized light synthesizing apparatus for the optical transmitting apparatus 1001 and 1002, the pump light outputting apparatus 2000 and the pump light splitting apparatus 3000 may be replaced with a pump light synthesizing unit 100*b* shown in FIG. 7, for example.

FIG. 7 is a sectional view schematically showing a structure of a first modification of the polarized light synthesizing apparatus of the first embodiment of this invention. As shown in FIG. 7, the pump light synthesizing unit 100b has a lens assembly 100*b*, a birefringent crystal 120*b* and a lens holder 130. The lens assembly 100*b* has a ferrule 111*b* and a collimator lens 112.

In FIG. 7, like reference characters designate like or corresponding parts, descriptions of which are thus omitted.

The ferrule 111*b* is a securing member for securing ends of the polarization maintaining fibers (PMFs) 211 and 221. As shown in FIG. 7, the ferrule 111*b* secures the ends of the PMFs 211 and 221 in parallel and equal distances away from a center axis of the collimator lens 112 such that light having different planes of polarization perpendicular to each other is emitted.

The PMFs 211 and 221 are two optical fibers which can propagate light having orthogonal polarization components. Opposite to the ends of the PMFs 211 and 221 where the polarized light synthesizing apparatus 100*b* is disposed, there are disposed pumping LDs not shown in FIG. 7.

The collimator lens 112 is a lens polarizing plural kinds of polarization component light emitted from the PMFs 211 and 221 into collimated beams, which is disposed on the downstream (on the right side in FIG. 7) of the ferrule 111*b*.

The birefringent crystal 120*b* is a uniaxial birefringent crystal such as rutile (TiO$_2$), calcite or the like, having a property that a refractive index thereof is varied according to a direction of vibration of light (plane of polarization) with respect to a crystallographic axis thereof. The birefringent crystal 120b is a birefringent member for polarization-synthesizing the plural kinds of polarization component light into light of the same optical axis using a difference in refractive index between the plural kinds of polarization component light emitted from the collimator lens 112.

Namely, when passing through the birefringent crystal 120b, light having a plane of polarization perpendicular to the crystallographic axis v of the birefringent crystal 120b (ordinary ray) is prone to go straight since it has a small refractive index, whereas light having a plane of polarization in parallel to the crystallographic axis v of the birefringent crystal 120b (extraordinary ray) passes through the birefringent crystal 120b with a large angle since it has a large refractive index.

The birefringent crystal 120b is a tapered birefringent crystal whose crystollographic axis v is perpendicular to the optical axis. A surface of the birefringent crystal 120b facing the collimator lens 112 is so formed as to be perpendicular to the PMFs 211 and 221. Hereinafter, the surface of the birefringent crystal 120b facing the collimator lens 112 will be called a vertical surface.

The other surface of the birefringent crystal 120b opposite to the surface facing the collimator lens 112 is formed as a tapered surface so as to be inclined at a predetermined angle (an angle determined according to a distance from the PMFs 211 and 221 to the center axis of the collimator lens 112, a refractive index of the collimator lens 112, etc.). When two kinds of light emitted to a plane of incidence of the birefringent crystal 120b is emitted from a plane of radiation of the birefringent crystal 120b, the two kinds of light are multiplexed into the same optical axis. Hereinafter, the inclined surface of the birefringent crystal 120b will be called a tapered surface.

According to the first embodiment shown in FIG. 7, the crystallographic axis v of birefringent crystal 120b is in parallel to the plane of polarization of the PMF 211, and incident light from the PMF 211 passes as an extraordinary ray while incident light from the PMF 221 passes as an ordinary ray through the birefringent crystal 120b.

In the above structure, two kinds of light emitted from the pumping LDs 210 through 240 (refer to FIG. 3) toward the PMFs 211 and 221 are emitted to positions equally spaced from the center axis of the collimator lens 112 in a state where the two kinds of light have planes of polarization perpendicular to each other, become collimated beam light, and emitted to the vertical surface of the birefringent crystal 120b with predetermined output angles.

In the birefringent crystal 120b, the light emitted from the PMF 221 passes as an ordinary ray through the birefringent crystal 120b with a high linearity, whereas the light emitted from the PMF 211 passes as an extraordinary ray while being largely refracted through the biregirigent crystal 120b, and the two kinds of light are polarization-synthesized to be light of the same optical axis and emitted from the tapered surface of the birefringent crystal 120b.

The first modification of the polarized light synthesizing apparatus according to the first embodiment of this invention can provide the same functions and effects as the above polarized light synthesizing apparatus shown in FIG. 1, besides a structure of the ferrule 111b is simplified. Therefore, a structure of the first modification of the polarized light synthesized apparatus of the first embodiment can be readily fabricated, which leads to a decrease of the manufacturing cost.

Figure 8:
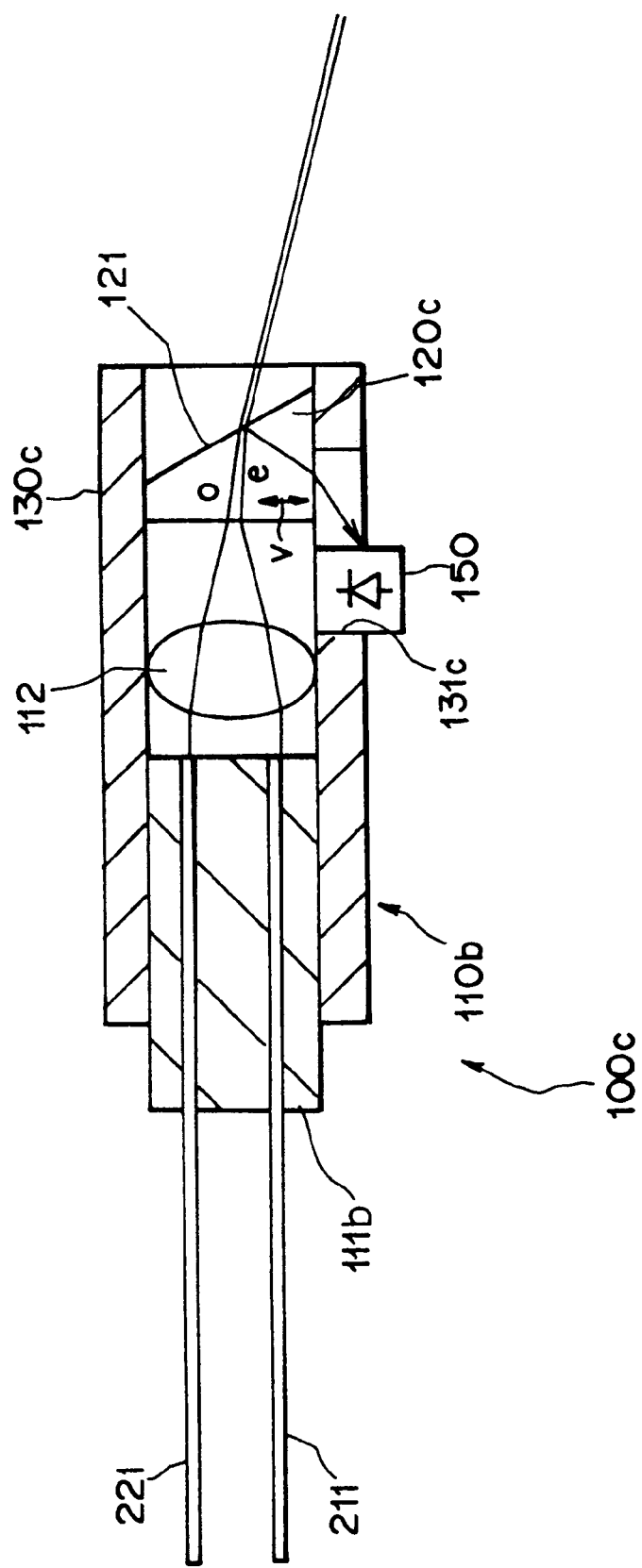
FIG. 8 is a sectional view schematically showing a structure of a second modification of the polarized light synthesizing apparatus according to the first embodiment of this invention.

(C) Description of a Second Modification of the First Embodiment of the Invention Each of the pump light synthesizing units 100a-1 and 100a-2 (refer to FIG. 3) as the polarized light synthesizing apparatus for the optical transmitting apparatus 1001 and 1002, the pump light outputting apparatus 2000 and the pump light splitting apparatus 3000 may be replaced with a pump light synthesizing unit 100c as shown in FIG. 8, for example.

FIG. 8 is a sectional view schematically showing a structure of a second modification of the polarized light synthesizing apparatus according to the first embodiment of this invention. The pump light synthesizing unit 100c has, as shown in FIG. 8, a lens holder 130c instead of the lens holder 130c in the polarized light synthesizing apparatus 100b shown in FIG. 7, along with a light receiving PD 150. The pump light synthesizing unit 100c further has a birefringent crystal 120c instead of the birefringent crystal 120b. The other portions are similar to those of the polarized light synthesizing apparatus 100b shown in FIG. 7.

In FIG. 8, like reference characters designate like or corresponding parts, descriptions of which are thus omitted.

The birefringent crystal 120c has a structure similar to that of the birefringent crystal 120b of the polarized light synthesizing apparatus 100b shown in FIG. 7. However, a coupler film 121 is evaporated on a plane of incidence of the birefringent crystal 120c whose angle of incidence is large so that a part of incident light entering the plane of incidence (namely, sum components of pump light having different polarization components coming from the PMFs 211 and 221) is reflected by the coupler film 121, and emitted to the light receiving PD 150.

The lens holder 130c is manufactured from a stainless pipe or the like, similarly to the lens holder 130 of the polarized light synthesizing apparatus 100a shown in FIG. 1 or the polarized light synthesizing apparatus 100b shown in FIG. 7, which is served to secure the ferrule 111b, the collimator lens 112 and the birefringent crystal 120c. A cutout portion 131c is formed in the lens holder 130c in the vicinity of a path of reflected pump light reflected by the coupler film 121 of the birefringent crystal 120c. Further, a light receiving PD 150 is disposed in the cutout portion 131c.

The light receiving PD 150 is a light receiving element demodulating received light into an electric signal, which functions as a monitoring unit for monitoring polarization component light reflected by the coupler film 121. The light receiving PD 150 receives pump light reflected by the coupler film 121 to demodulate the pump light to an electric signal, and sends the electric signal to a pump light control apparatus not shown, thereby monitoring a sum of components of the polarization component light.

The apparatus has the pump light control apparatus not shown to control the pumping LDs 210 through 240 (refer to FIG. 3) in order to output pump light of a predetermined quantity of light. The pump light control apparatus receives an electric signal according to an intensity of pump light sent from the light receiving PD 150, compares the electric signal with a reference value set in advance in the pump light control apparatus, and controls the pumping LDs 210 through 240 such that the electric signal coincides with the reference value.

In the above structure, two kinds of pump light emitted from the pumping LDs 210 through 240 (refer to FIG. 3) to the PMFs 211 and 221 are emitted in parallel to a center axis of the collimator lens 112 on positions equally spaced from the center axis of the collimator lens 112 in a state where the two kinds of pump light have orthogonal planes of polarization, become collimated beams, and emitted to the vertical surface of the birefringent crystal 120c at predetermined angles of radiation.

In the birefringent crystal 120c, the light emitted from the PMF 221 passes as an ordinary ray with a high linearity therethrough, whereas the light emitted from the PMF 211 passes as an extraordinary ray therethrough while being largely refracted, and the two kinds of light are polarization-synthesized to be light of the same optical axis and emitted from the tapered surface of the birefringent crystal 120c.

A part of the pump light polarization-synthesized as the light of the same optical axis by the tapered surface of the birefringent crystal 120c is reflected by the coupler film 121 evaporated on the tapered surface, and emitted toward the light receiving PD 150. The part of the pump light reflected is converted into an electric signal by the light receiving PD 150. The pump light control apparatus controls the pumping LDs 210 through 240 on the basis of a value of the electric signal so as to supply pump light stable at all times to the apparatus.

The second modification of the polarized light synthesizing apparatus of the first embodiment can provide the same functions and effects as the above polarized light synthesizing apparatus shown in FIG. 7. Further, it is possible to monitor polarization-synthesized pump light reflected by the coupler film 121 by means of the light receiving PD 150 to control the pumping lasers 210 through 240, thereby obtaining a stable pump light output. It is also possible to prevent an optical signal at an excessive optical level from being emitted to the optical fiber when the apparatus is used in the optical transmitting apparatus. Therefore, it is possible to prevent a phenomenon that the optical signal is accumulatively amplified in repteating when passing through repeaters and the like and the light of an excessive power is further increased when the terminal receives the optical signal, thus no effect is exerted on qualities of optical components receiving the optical signal in the receiving unit.

Figure 9:
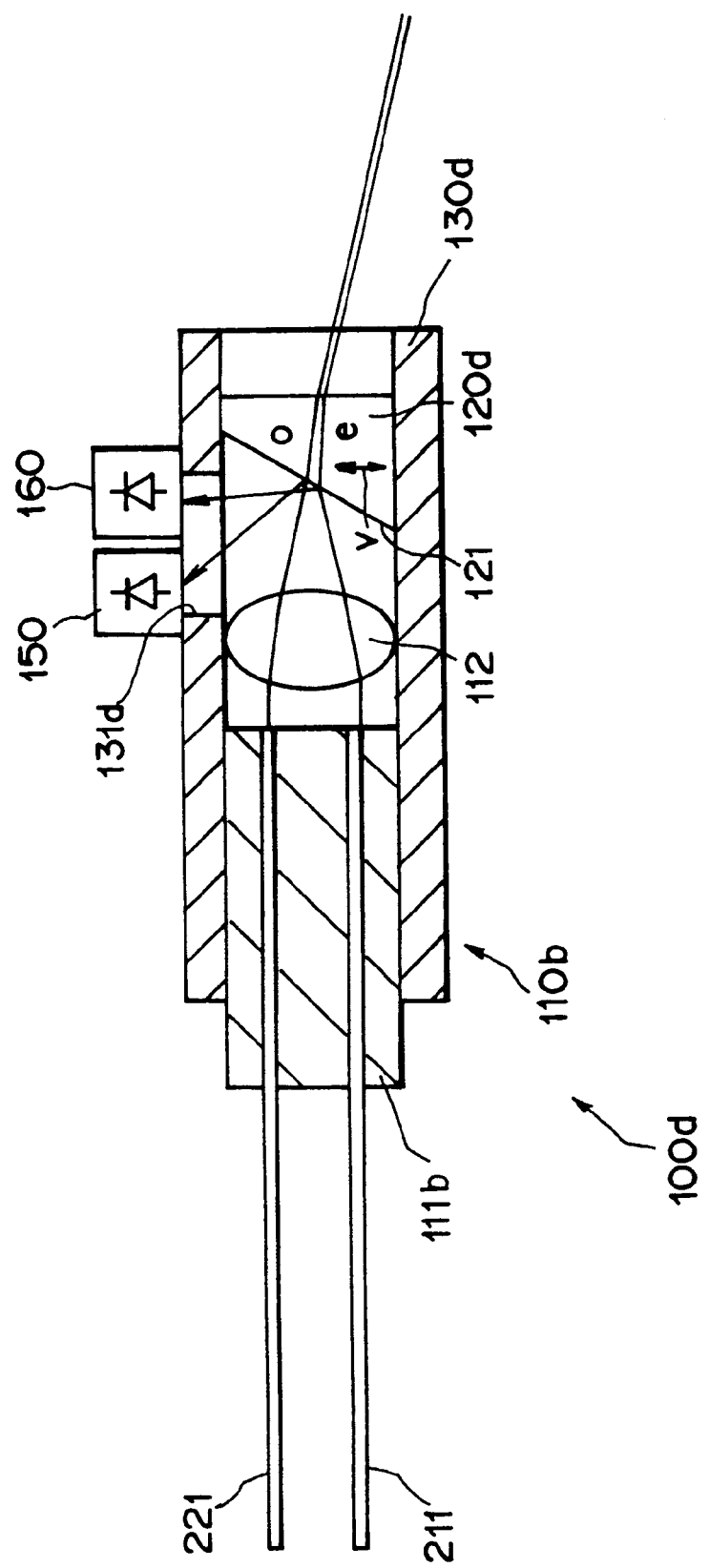
FIG. 9 is a sectional view schematically showing a structure of a third modification of the polarized light synthesizing apparatus according to the first embodiment of this invention.

(D) Description of a Third Modification of the First Embodiment of the Invention Each of the pump light synthesizing units 100a-1 and 100a-2 (refer to FIG. 3) as the polarized light synthesizing apparatus for the optical transmitting apparatus 1001 and 1002, the pump light outputting apparatus 2000 and the pump light splitting apparatus 3000 may be replaced with a pump light synthesizing unit 100d as shown in FIG. 9, for example.

FIG. 9 is a sectional view schematically showing a structure of a third modification of the polarized light synthesizing apparatus of the first embodiment of this invention. The pump light synthesizing unit 100d has a lens holder 130d instead of the lens holder 130c of the polarized light synthesizing apparatus 100c shown in FIG. 8, along with light receiving PDs 150 and 160. The pump light synthesizing unit 100d further has a birefringent crystal 120d instead of the birefringent crystal 120c.

The other portions are similar to those of the polarized light synthesizing apparatus 100d shown in FIG. 8.

In FIG. 9, like reference characters designate like or corresponding parts, descriptions of which are thus omitted.

The birefringent crystal 120d has the same structure as the birefringent crystal 120c of the polarized light synthesizing apparatus 100c shown in FIG. 8. However, the tapered surface of the birefringent crystal 120d faces the collimator lens 112.

Namely, a surface (plane of incidence) of the birefringent crystal 120d facing the collimator lens 112 is such formed as to be inclined at a predetermined angle (an angle determined according to a distance from the PMFs 211 and 221 to the center axis of the collimator lens 112, a refractive index of the collimator lens 112, etc.) (hereinafter, called a tapered surface). On the other hand, the other surface of the birefringent crystal 120b on the side opposite to the collimator lens 112 is such formed as to be perpendicular to optical axes of the PMSs 211 and 221. Two kinds of incident light entering the plane of incidence (tapered surface) of the birefringent crystal 120d are multiplexed into light of the same optical axis when emitted from a plane of radiation (vertical surface) of the birefringent crystal 120d.

A coupler film 121 is evaporated on the plane of incidence (tapered surface) of the birefringent crystal 120d whose angle of incidence is large. A part of the pump light emitted to the tapered surface (namely, pump light having different polarization components emitted from the PMFs 211 and 221) is reflected by the coupler film 121, and emitted to the light receiving PDs 150 and 160.

The lens holder 130d is manufactured from a stainless pipe or the like, similarly to the lens holder 130 of the polarized light synthesizing apparatus 100c shown in FIG. 8, which is served to secure the ferrule 111b, the collimator lens 112 and the birefringent crystal 120c. A cutout portion 131d is formed in the lens holder 130d in the vicinity of optical paths of the two kinds of pump light reflected by the coupler film 121 of the birefringent crystal 120d. Further, the light receiving PDs 150 and 160 are disposed in the cutout portion 131d.

The light receiving PDs 150 and 160 are light receiving elements demodulating received light into electric signals, which are monitoring units for monitoring polarization component light reflected by the coupler film 121. Each of the light receiving PDs 150 and 160 receives the pump light reflected by the coupler film 121 to demodulate the pump light into an electric signal, and sends the electric signal to a pump light control apparatus not shown.

In the polarized light synthesizing apparatus 100d shown in FIG. 9, the pump light emitted from the PMF 211 is emitted to the light receiving PD 160, whereas the pump light emitted from the PMF 221 is emitted to the light receiving PD 150.

The apparatus has the pump light control apparatus not shown to control the pumping LDs 210 through 240 (refer to FIG. 3) in order to output plural kinds of pump light of predetermined quantities of light. Each of the pump light control apparatus receives an electric signal according to an intensity of a pump light sent from a corresponding the light receiving PDs 150 or 160, compares the electric signal with a reference value set in advance in the pump light control apparatus, and controls the corresponding pumping LD 210, 220, . . . or through 240 such that the electric signal coincides with the reference value.

In the above structure, plural kinds of pump light emitted from the pumping LDs 210 through 240 to the PMFs 211 and 221 are emitted in parallel to the center axis of the collimator lens 112 to positions equally spaced from the center axis of the collimator lens 112 in a state where the two kinds of pump light have orthogonal planes of polarization to be collimated beams, and emitted with predetermined angles of radiation to the tapered surface of the birefringent crystal 120d.

A part of the pump light radiated on the tapered surface of the birefringent crystal 120d is reflected by the coupler film 121 evaporated on the tapered surface, and emitted to the light receiving PDs 150 and 160. With respect to the remaining part of the pump light entering the birefringent crystal 120d, the light emitted from the PMF 221 passes as an ordinary ray through the birefringent crystal 120d with high linearity, whereas the light emitted from the PMF 211 is passes while largely refracted as an extraordinary ray through the birefringent crystal 120c, and the two kinds of pump light are polarization-synthesized to be light of the same optical axis and emitted from the vertical surface of the birefringent crystal 120c.

A part of the pump light emitted to the light rereceiving PDs 150 and 160 is converted into electric signals and sent to the pump light control apparatus not shown. The pump light control apparatus control the pumping LDs 210 through 240 on the basis of values of the electric signals to supply pump light stable at all times.

The third modification of the polarized light synthesizing apparatus of the first embodiment of this invention can provide the same functions and effects as the above polarized light synthesizing apparatus shown in FIG. 8. Further, the polarized light synthesizing apparatus according to the third modification can monitor the two kinds of pump light reflected by the coupler film 121 by means of the light receiving PDs 150 and 160 to control the pump light lasers 210 through 240, so as to individually control the light sources for respective polarization components of the pump light and perform a pump light control in a higher level. It is therefore possible to provide the polarized light synthesizing apparatus having a high quality and a high reliability.

(E) Description of a Second Embodiment of the Invention

Figure 10:
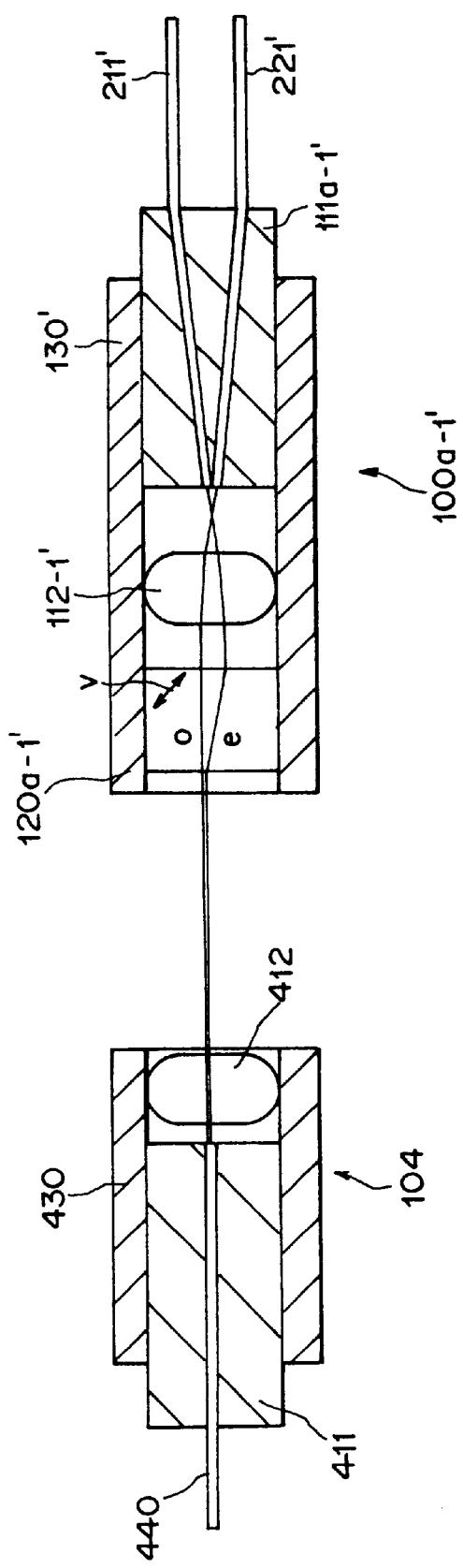
FIG. 10 is a sectional view schematically showing a structure of a polarized light splitting apparatus according to a second embodiment of this invention.
Figure 11:
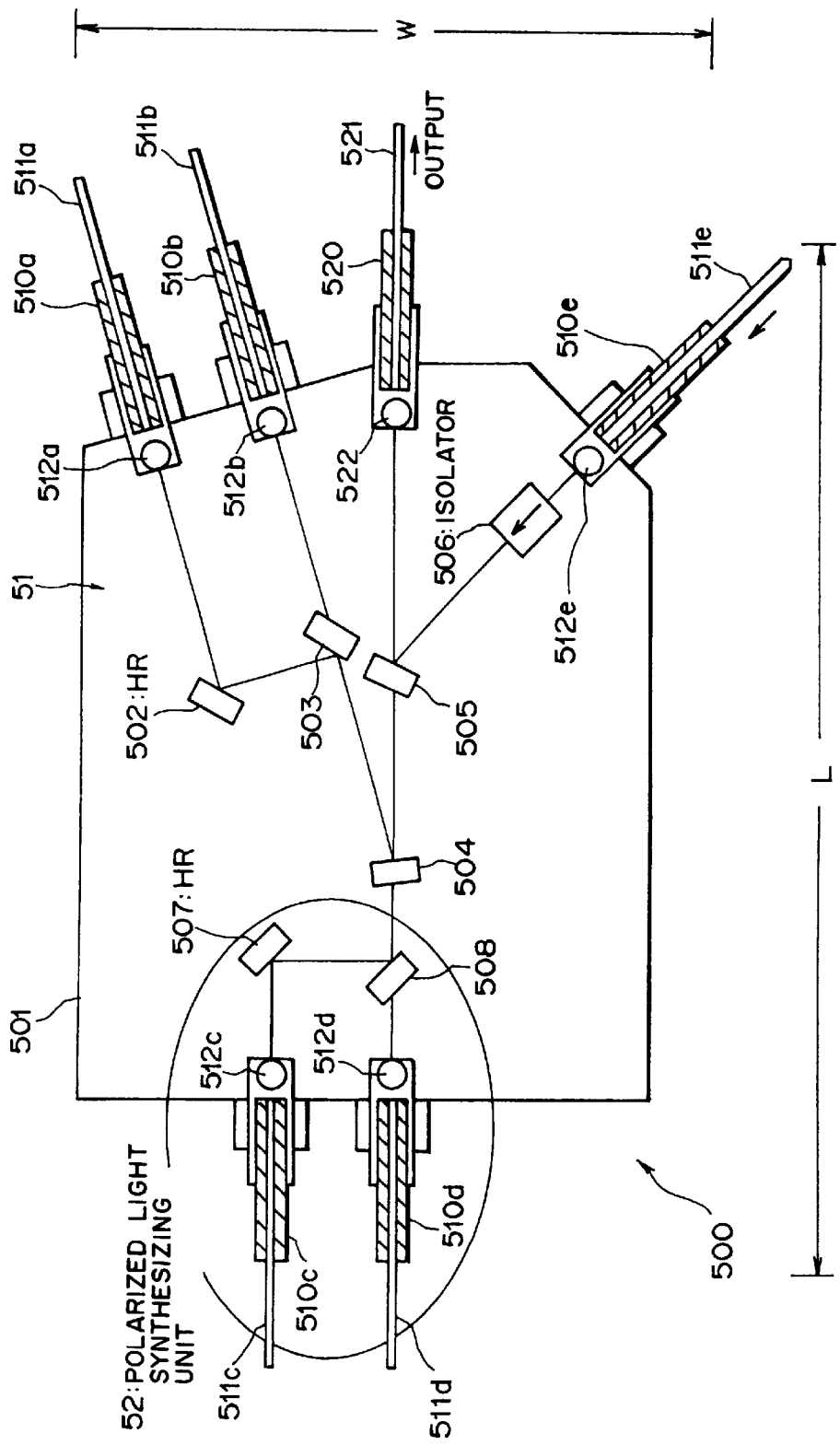
FIG. 11 is a plan view schematically showing a structure of a known pump light outputting apparatus.
Figure 12:
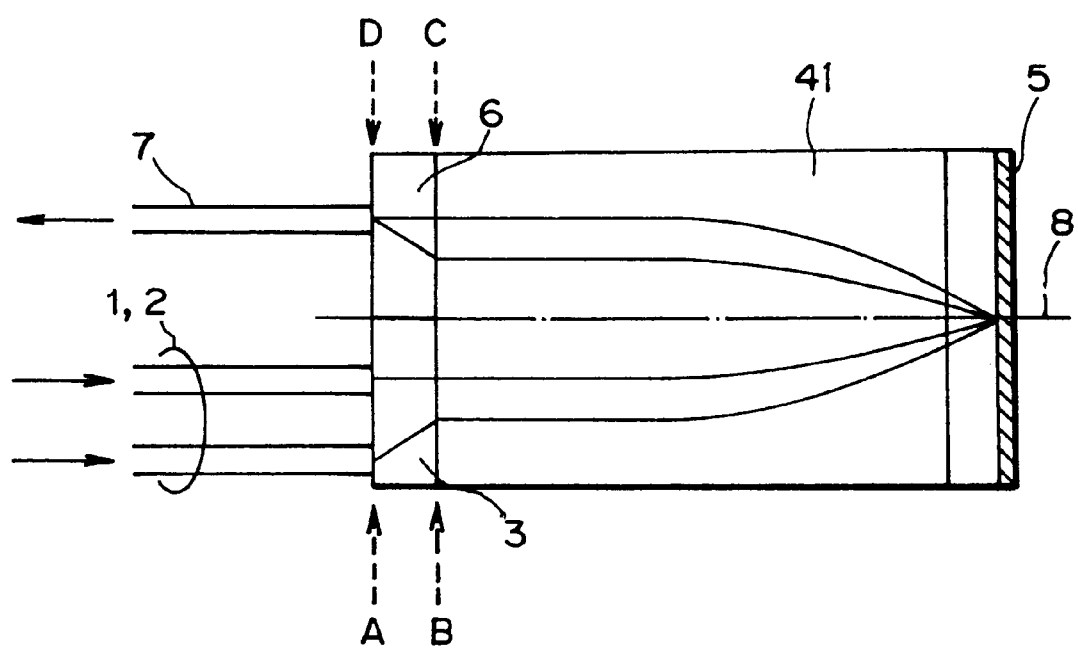
FIG. 12 is a diagram schematically showing a structure of a polarized light synthesizing apparatus.

FIG. 10 is a sectional view schematically showing a structure of a polarized light splitting apparatus according to a second embodiment of this invention. The polarized light splitting apparatus can be used for a polarization diversity receiver, for example.

The polarized light splitting apparatus 100a-1' has, as shown in FIG. 10, a lens assembly 110a-1', a birefringent crystal 120a-1' and a lens holder 130', similarly to the pump light synthesizing apparatus 100a-1 shown in FIG. 1. The lens assembly 110a-1' has a ferrule 111a-1' and a collimator lens 112-1', which polarization-splits light inputted from the birefringent crystal 120a-1 to polarization components and emits the light from the PMF 211' and 221', in contrast with the pump light synthesizing apparatus 100a-1 shown in FIG. 1.

FIG. 10 shows a state where light is emitted from the light emitting apparatus 104 toward the polarized light splitting apparatus 100a-1' for the sake of convenience, in order to illustrate the polarized light splitting apparatus 100a-1'.

The light emitting apparatus 104 has a collimator lens 412, a ferrule 411 and a lens holder 430. The ferrule 411 secures an optical fiber 440 on the center axis of the collimator lens 412. The lens holder 430 secures the collimator lens 412 and the ferrule 411, so that light emitted from the optical fiber 440 becomes collimated beams by passing through the collimator lens 412, and is emitted toward the polarized light splitting apparatus 100a-1'.

Polarization maintaining fibers (PMFs) 211' and 221' which are two optical fibers being able to propagate orthogonal polarization components are connected to the polarized light splitting apparatus 100a-1', and light receiving PDs 310 and 320 (refer to FIG. 4) are disposed on the other ends of the PMFs 211' and 221.

The ferrule 111a-1', the collimator lens 112-1', the birefringent crystal 120a-1' and the lend holder 130' have structures similar to those of the ferrule 111a-1, the collimator lens 112-1, the birefringent crystal 120a-1 and the lens holder 130 of the pump light synthesizing unit 100a-1 shown in FIG. 1, descriptions of which are thus omitted.

In the above structure, light emitted from the light emitting apparatus 104 is emitted to an end (the left surface in FIG. 10) of the birefringent crystal 120a-1'. In the birefringent crystal 120a-1', light having a plane of polarization perpendicular to the crystallographic axis v of the birefringent crystal 120a-1' passes as an ordinary ray with high linearity through the biregrigent crystal 120a-1', whereas light having a plane of polarization in parallel to the crystallographic axis v of the birefringent crystal 120a-1' passes therethrough while largely refracted. The both kinds of light are emitted from different positions on the other surface of the birefringent crystal 120a-1'.

The two kinds of light emitted from the birefringent crystal 120a-1' are emitted to positions equally spaced from the center axis of the collimator lens 112-1' and pass through the collimator lens 112-1'. The two kinds of light are converted into collimated beams by passing through the collimator lens 112-1', emitted with predetermined angles from the other surface of the collimator lens 112-1', and emitted to the PMF 211' and 221'.

In the embodiment shown in FIG. 10, a crystallographic axis v of the birefringent crystal 120a-1' is inclined at an acute angle (450 in this embodiment, for example) to a direction of travel of incident light. Light having a plane of polarization perpendicular to the crystallographic axis v is emitted to the PMF 221', whereas light having a plane of polarization in parallel to the crystallographic axis v is emitted to the PMF 211'.

The polarized light splitting apparatus according to the second embodiment can readily split polarization components of the incident light by means of the lens assembly 110a-1' and the birefringent crystal 120a-1', so as to accomplish polarization-splitting with one port, which leads to a reduce in packaging size of the apparatus, and a reduce of a cost by decreasing the number of used members. For example, it is possible to fabricate a polarization diversity receiver in a small size and at a low cost by using the apparatus as a receiving unit of the polarization diversity receiver.

Note that the polarized light splitting apparatus according to the second embodiment may be used not only as a receiving unit of a polarization diversity receiver but also may be modified in various ways without departing from a scope of the invention.

(F) Others

In the above embodiment, the pump light outputting apparatus shown in FIG. 3 has the pump light synthesizing units 100a-1 and 100a-2 shown in FIG. 1. However, this invention is not limited to the above example, but the pump light outputting apparatus may have any pump light synthesizing unit shown in FIG. 7, 8 or 9. The pump light outputting apparatus of this invention may be modified in various ways without departing from a scope of the invention.

In the above embodiment, the pump light splitting apparatus shown in FIG. 4 has the polarized light splitting apparatus 100a-1' and 100a-2' with structures approximately same as the pump light synthesizing units 100a-1 and 100a-2 shown in FIG. 1. However, this invention is not limited to the above example, but the pump light splitting apparatus may have the same polarized light splitting apparatus as any pump light synthesizing apparatus shown in FIG. 7, 8 or 9, and be modified in various ways without departing from a scope of the invention.

In the above embodiment, the pump light outputting apparatus shown in FIG. 3, the pump light synthesizing apparatus shown in FIGS. 8 and 9, and the pump light splitting apparatus shown in FIG. 4 include the light receiving PDs 830, 150, 160, 310 through 340 and 370. This invention is not limited to the above example, but it is possible to use avalanche photodiodes, and modify in various ways without departing from a scope of the invention.

This invention is not limited to the above examples, but may be modified in various ways without departing from a scope of the invention.

What is claimed is:

1. A polarized light synthesizing apparatus for synthesizing a pair of polarized light beams, which are inputted from a pair of input optical fibers, and outputting a synthesized light beam, which has synthesized the pair of light beams, to an output optical fiber, comprising:
    a lens assembly comprising,
        a securing member to secure both ends of said pair of input optical fibers, each input optical fiber serving to propagate a first polarized light having a polarization characteristic different from that of a second polarized light which is propagated by the other optical fiber; and
        a lens that converts the first and second polarized light, which is emitted from said pair of input optical fibers, into individual collimated beams and outputs the individual collimated beams of the first and second polarized light; and
    a birefringent member, located downstream of the lens assembly, that synthesizes the individual collimated beams emitted from the lens in such a manner that the individual collimated beams have a common optical axis.

2. The polarized light synthesizing apparatus according to claim 1, wherein said securing member secures the pair of optical fibers, each optical fiber operable to emit two kinds of light having a different, perpendicular plane of polarization, such that the ends of said optical fibers get close to each other or contact with each other, and said birefringent member is a planar birefringent crystal whose crystallographic axis assumes an acute angle with respect to a direction of travel of the light.

3. The polarized light synthesizing apparatus according to claim 2, wherein said securing member is formed by joining two ferrule members securing said pair of optical fibers.

4. The polarized light synthesizing apparatus according to claim 1, wherein said securing member secures the pair of optical fibers, each optical fiber operable to emit two kinds of light having a different, perpendicular plane of polarization, in parallel, and a tapered birefringent crystal whose crystallographic axis is perpendicular to an optical axis is provided as said birefringent member.

5. The polarized light synthesizing apparatus according to claim 1, wherein said pair of optical fibers are configured with polarization maintaining optical fibers being able to propagate plural kinds of light having different orthogonal planes of polarization while maintaining polarized states.

6. The polarized light synthesizing apparatus according to claim 4, wherein a coupler film is vapor deposited on a plane of incidence having a large angle of incidence among a plurality of planes of incidence of said tapered birefringent crystal into which said plural kinds of polarization component light incident, and a monitoring unit is provided on an optical path of light reflected by said coupler film to monitor said plural kinds of polarization component light.

7. The polarized light synthesizing apparatus according to claim 6, wherein said monitoring unit has a photodiode monitoring a sum of components of said plural kinds of polarization component light.

8. The polarized light synthesizing apparatus according to claim 6, wherein said monitoring unit has a plurality of photodiodes monitoring said plural kinds of polarization component light separately.

9. A polarized light splitting apparatus for splitting a synthesized light beam, which is inputted from an input optical fiber, into a pair of individual polarized light beams and individually outputting the split individual polarized light beams to a pair of output optical fibers, comprising:
    a birefringent member, which is located downstream of said input optical fiber, that splits the synthesized light beam emitted from the input optical fiber into the pair of individual polarized light beams, each light beam having a unique polarization characteristic, using a difference in refractive-indexes of the plurality of polarized light beams; and
    a lens assembly having,
        a lens, which is located downstream of said birefringent member, that converts said individual polarized light beams emitted from said birefringent member into individual collimated beams and then outputs the individual collimated beams to said pair of optical fibers individually; and
        a securing member that secures ends of said pair of optical fibers, each fiber serving to propagate the individual collimated beams.

10. A pump light outputting apparatus for synthesizing a received optical signal with pump light beam and outputting the resultant optical signal, comprising:
    a polarized light synthesizing unit that synthesizes a pair of light beams inputted from a pair of input optical fibers, each light beam having unique polarization characteristics and common wavelength bands and then outputs a synthesized light beam, which is synthesized from the pair of light beams, to an output optical fiber as the pump light used for amplifying the optical signal, said polarized light synthesizing unit including,
        a lens assembly having
            a securing member that secures both ends of said pair of input optical fibers, each fiber serving to propagate a first polarized light having a unique polarization characteristic different from that of a second polarized light which is propagated by the other optical fiber; and
            a lens that converts the first and second polarized light, which is emitted from said plurality of input optical fibers, into individual collimated beams and emits the individual collimated beams of the first and second polarized light; and
        a birefringent member, located downstream of the lens assembly, that synthesizes the individual collimate beams emitted from the lens in such a manner that the individual collimate beams have a common optical axis, and outputs said polarization-synthesized light to said output optical fiber.

11. The pump light outputting apparatus according to claim 10, wherein the light synthesized by said polarized light synthesizing unit is used as pump light for copropagating pumping or counterpropagating pumping for a remote optical amplifier connected via said output optical fiber.

12. The pump light outputting apparatus according to claim 10 further comprising a wavelength-division multiplexing/demultiplexing unit for performing a wavelength-division multiplexing process or a wavelength-division demultiplexing process on said light synthesized by said polarized light synthesizing unit and signal light including data information having a wavelength different from a wavelength of said light synthesized by said polarized light synthesizing unit.

13. A pump light outputting apparatus for synthesizing a pair of received optical signals with a pump light beam and outputting a resultant synthesized light beam which is synthesized from the received optical signals, comprising:
  a first polarized light synthesizing unit that synthesizes a plurality of inputted first light beams, as a first pump light beam, each of the plurality of inputted first light beams having a first wavelength band and a unique polarization characteristic different from any of the remaining first light beams;
  a second polarization synthesizing unit that synthesizes a plurality of inputted second light beams, as a second pump light beam, each of the plurality of inputted second light beams having a second wavelength band, which is different from said first wavelength band, and also having a unique polarization characteristic, different from any of the remaining second light beams; and
  a multiplexing unit that multiplexes said first pump light beam and the second pump light beam into a composite pump light beam and outputs the composite light beam made of the fist pump light beam and the second pump light beam;
  said first polarized light synthesizing unit including
    a first lens assembly having
      a first securing member that secures ends of a pair of first pumping input optical fibers, each input optical fiber operable to propagate the first light beams and each input optical fiber having said first wavelength band and unique polarization characteristic different from the polarized light to be propagated by the other input optical fiber, and
      a first lens that converts the polarized light emitted from said first pumping optical fibers into collimated beams; and
    a first birefringent member, which is located downstream of said first lens, that synthesizes the individual collimated beams of polarized light, in such a manner that the individual collimated beams have a common optical axis, and emits the light beams to said multiplexing unit;
  said second polarization synthesizing unit including
    a second lens assembly having
      a second securing member that secures ends of a pair of second pumping input optical fibers, each input optical fiber operable to propagate the second light beams, each input optical fiber having said second wavelength band and unique polarization characteristic different from the polarized light to be propagated by the other input optical fiber, and
      a second lens that converts the polarized light emitted from said second pumping optical fibers into collimated beams; and
    a second birefringent member, which is located downstream of said second lens, that synthesizes the individual collimated beams of polarized light, in such a manner that the individual collimated beams have a common optical axis, and emits the light beams to said multiplexing unit.

14. The pump light outputting apparatus according to claim 13, wherein said light multiplexed by said multiplexing unit is used as pump light for copropagating pumping or counterpropagating pumping for a remote optical amplifier.

15. The pump light outputting apparatus according to claim 13 further comprising a wavelength-division multiplexing/demultiplexing unit for performing a wavelength-division multiplexing process or a wavelength-division demultiplexing process on the light multiplexed by said mutliplexing unit and signal light including data information while having a wavelength different from a wavelength of said light multiplexed by said coupling unit.

16. A polarized light synthesizing apparatus for synthesizing input polarized light beams and outputting a synthesized light to an output optical fiber, comprising:
  a lens assembly, including
    a securing member that secures ends of a plurality of input optical fibers, each of the plurality of input fibers serving to input polarized light having a unique polarization characteristic different from that input by any one of the other input optical fibers; and
    a lens that converts the input polarized light, which is emitted from said input optical fibers, into collimated beams; and
  a birefringent member, located downstream of the lens assembly, that synthesizes the collimated beams, based on the different polarization characteristics, in such a manner that the collimated beams have a common optical axis and are the synthesized light.

17. A polarized light synthesizing apparatus for synthesizing a first polarized light beam and a second polarized light beam, which are inputted from an individual pair of input optical fibers, and outputting a synthesized polarized light beam, which is synthesized from both of the first polarized light beam and the second polarized light beam, to an output optical fiber, comprising:
  a lens; and
  a birefringent member, that when the individual pair of input optical fibers are arranged so that a pair of tip ends of the pair of input optical fibers are distant from vertical axis of the lens by an equal distance and each of the pair of input optical fibers assumes an optimum symmetrical angle with respect to a horizontal axis of the lens and the lens converts the second polarized light beam and the first polarized light beam, which has a polarization characteristic different from that of the second polarized light beam, into a pair of collimated beams and outputs the individual collimated beams of the first polarized light and the second polarized light to the birefringent member, and the birefringent member, which is located downstream of the lens, synthesizes the individual collimated beams emitted from the lens in such a manner that the individual collimated beams have a common optical axis.

* * * * *

UNITED STATES PATENT AND TRADEMARK OFFICE
CERTIFICATE OF CORRECTION

PATENT NO.    : 6,295,393 B1
DATED         : September 25, 2001
INVENTOR(S)   : Norihisa Naganuma It is certified that error appears in the above-identified patent and that said Letters Patent is hereby corrected as shown below:

Claim 12,
Line 2, after "claim 10" insert -- , --.
Line 6, before "signal" insert -- a --.

Signed and Sealed this

Twenty-sixth Day of March, 2002

Attest:

JAMES E. ROGAN
*Attesting Officer*    *Director of the United States Patent and Trademark Office*